United States Patent
Tanaka et al.

(10) Patent No.: US 12,253,722 B2
(45) Date of Patent: Mar. 18, 2025

(54) MAGNETO-OPTICAL KERR EFFECT INTERCONNECTS FOR PHOTONIC PACKAGING

(71) Applicant: Intel Corporation, Santa Clara, CA (US)

(72) Inventors: Hiroki Tanaka, Gilbert, AZ (US); Kristof Darmawikarta, Chandler, AZ (US); Brandon Marin, Gilbert, AZ (US); Robert May, Chandler, AZ (US); Sri Ranga Sai Boyapati, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 756 days.

(21) Appl. No.: 17/357,788

(22) Filed: Jun. 24, 2021

(65) Prior Publication Data

US 2022/0413233 A1 Dec. 29, 2022

(51) Int. Cl.
*G02B 6/42* (2006.01)
*G02B 5/30* (2006.01)
*G02B 27/12* (2006.01)

(52) U.S. Cl.
CPC ......... *G02B 6/4204* (2013.01); *G02B 6/4244* (2013.01); *G02B 5/3033* (2013.01); *G02B 27/126* (2013.01)

(58) Field of Classification Search
CPC .. G02B 6/4204; G02B 6/4244; G02B 5/3033; G02B 27/126; G02B 6/2746; G02F 1/0136; G02F 1/09
See application file for complete search history.

(56) References Cited

U.S. PATENT DOCUMENTS

| | | | |
|---|---|---|---|
| 9,986,217 B2 * | 5/2018 | Ellwood, Jr. | H04N 9/3179 |
| 2010/0142028 A1 * | 6/2010 | Umnov | G02F 1/09 398/58 |
| 2023/0152537 A1 * | 5/2023 | Witzens | G02B 6/4213 385/33 |

* cited by examiner

*Primary Examiner* — John Bedtelyon
(74) *Attorney, Agent, or Firm* — Essential Patents Group, LLP

(57) ABSTRACT

An optical package comprising an optical die that is electrically coupled to a package substrate, and an optical interconnect adjacent the optical die. The optical interconnect comprises a first polarizing filter adjacent to a first lens, a second polarizing filter adjacent to a second lens; and a film comprising a magnetic material between the first polarizing filter and the second polarizing filter. The second polarizing filter is rotated with respect to the first polarizing filter and the magnetic material is to rotate a polarization vector of light incoming to the optical interconnect. An optical fiber interface port is immediately adjacent to the first lens. The second lens is immediately adjacent to an optical interface of the optical die.

13 Claims, 13 Drawing Sheets

MAGNETO-OPTICAL KERR EFFECT INTERCONNECTS FOR PHOTONIC PACKAGING

BACKGROUND

The photonics industry has experienced a significant growth in recent years due to the widespread adaptation of long-distance fiber optic communications by internet service providers and cloud-based data centers. Advantages of optical fiber-based data communications over traditional copper-based data communications is greatly increased long-haul bandwidth and significantly lower energy per bit. As attainable optical bandwidths can be significantly larger than copper-based electronic signal bandwidths, there is a growing demand by large users of optical communications to extend the bandwidth capabilities of their optical networks. For example, hyperscale cloud bandwidth demand is currently experiencing a 25% annual growth rate. In addition, requirements for lower power consumption per bit by photonic components is also increasing in proportion to signal bandwidth. Optical signals may propagate through optical fibers and waveguides over long distances with very low dispersion and distortion, enabling maintenance of significantly higher data throughput rates than are obtainable by electronic signals travelling through copper conductors. While optical signals are not subject to electromagnetic interference as are electronic signals, they may be subject to optical interference from back-scattered light coupled into the optical fiber. The optical interference may occur through adventitious reflections of the light exiting at interfaces where optical signals may be transferred from the fiber to a microphotonic device. For example, reflected light from a collimating lens or a beam-slitter prism may couple back into the fiber and interfere with forward-propagating light, resulting in distortion of the incoming signal. Distortion may result in dropped data bits or in extra data bits appearing in the data stream, causing an increase in bit error rate of the optical signal of the signal entering the microphotonic device. To reduce degradation of optical signals due to this type of distortion, a solution is needed to attenuate reflected and back-coupled light at optical fiber interfaces with microphotonic devices.

DETAILED DESCRIPTION

Figure 1A:
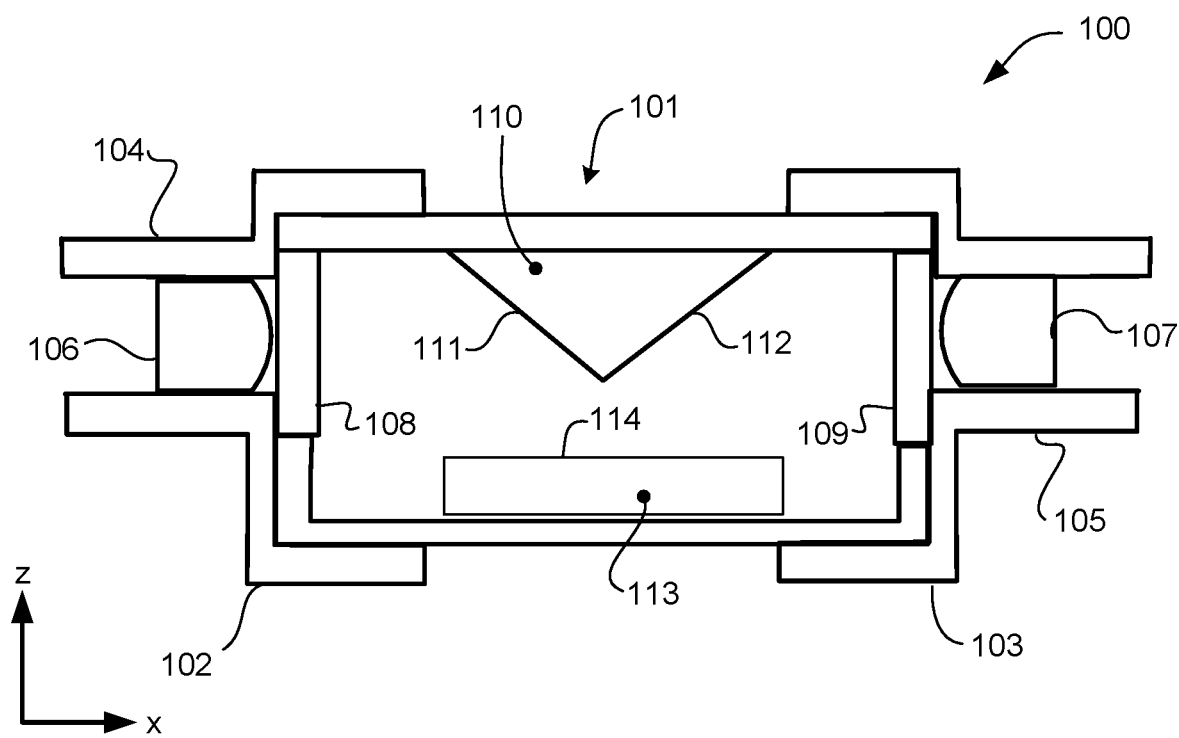
FIG. 1A illustrates a cross-sectional view in the x-z plane of a MOKE optical interconnect, according to some embodiments of the disclosure.

Disclosed herein is an anti-reflection optical interconnect employing a magneto-optical Kerr effect (MOKE) module to enable one-way transfer of light at optical interfaces between sources of incoming optical signals, such as optical fibers and coupling optics on optical dies within multi-chip optical packages (MCPs). The disclosed MOKE optical interconnect prevents backscattered light that is reflected off of external surfaces from re-entering the optical fiber or source, thus interfering with incoming optical signals, thereby mitigating distortion of the incoming optical signals. The disclosed optical interconnect comprises a MOKE module that suppresses passage of backscattered light, enabling one-way transfer of forward-propagating light through the disclosed MOKE optical interconnect. Incoming light entering the disclosed MOKE optical interconnect from an optical fiber coupled to an input port may enter the MOKE module, where it is linearly polarized by passing through a first polarizing filter. The polarized light, (e.g., represented by E, corresponding to polarization of the electric field vector of the light waves) carrying optical signals, may pass through a beam-splitting prism in some embodiments, or be directed by a pyramidal mirror comprising oblique mirror faces in some embodiments to impinge upon a surface of a magnetic (or magnetizable) material. The polarization angle of the incoming light may be rotated by interaction with the magnetic field B of the magnetic material. In some embodiments, an electromagnet coil is adjacent to a film or foil of a magnetizable material, where the H field generated by the coil induces a temporary magnetic moment (represented by the magnetic flux vector B) in the magnetizable material.

MOKE-rotated polarized optical signals may exit the disclosed optical interconnect through an output port, where a second polarizing filter is positioned in front of the output port. The second polarizing filter may be aligned to the polarization angle of the exiting light, permitting it to pass through with small loss of energy. Generally, the output port of the disclosed optical interconnect may be adjacent to receiving optics of a microphotonic device, such as a collimating lens or diffraction grating interface at a receiving port of an optical transceiver, for example. Some of the incoming light may be reflected from the surface of the receiving optics, and back-scatter into the optical interconnect. The polarization angle of the backscattered light may be maintained to a large degree. A portion of the backscattered light re-enters the MOKE module, where it passes again through the exit polarizing filter, albeit in the reverse direction. Once inside the MOKE module, the backscattered light is directed onto the magnetic surface, where it undergoes a second rotation of the polarization plane by the same amount as it experienced in the first rotation. The doubly-rotated light is directed toward the first (entrance) polarizing filter at the input port of the MOKE module where it is stopped and prevented from re-entering the optical fiber, as its polarization angle may be orthogonal to the first polarization filter.

In some embodiments, the MOKE module may comprise a beam-splitter configuration, whereby a portion of the incoming polarized light beam passes through a prism beam splitter and a partial mirror oriented at an oblique angle (e.g., at a 45° angle) to the incoming light beam. The partial mirror of the beam splitter may direct a portion of the incoming light to normal incidence on the magnetic surface. The orientation of the magnetic moment (e.g., e.g., represented by magnetic flux vector B) within the material may be perpendicular or parallel to the plane of the magnetic surface. Rotated light reflected from the magnetic material may impinge at an oblique angle to the partial mirror, where a portion of the rotated light is re-directed toward a second (exit) polarizing filter. In the beam-splitter configuration, the entrance and exit ports may be orthogonal to each other, whereas in the pyramidal mirror configuration, the entrance and exit coupling ports may be in-line.

In some embodiments, the MOKE module may comprise a prism or pyramidal mirror between first and second polarizing filters. A magnetic or magnetizable material is also positioned between the first and second polarization filters, opposite the prism or pyramidal mirror. The pyramidal mirror may comprise at least two oblique mirror surfaces, where the oblique mirror surfaces are on adjacent or opposite faces of the pyramid. Incoming light may encounter the first (entrance) polarization filter, where the light is polarized. The polarized light may then reflect off of a first oblique mirror face of the prism or to strike the surface of the magnetic (or magnetizable) material.

As described above, the angle of polarization vector E of the incoming light is rotated to a new polarization vector E' by MOKE interaction with the magnetic field B of the magnetic or magnetizable material, where E' has a different polarization angle than E, the original polarization angle of the light after passage through the first polarizing filter. Rotated light may be reflected from the magnetic surface back to the partial mirror of the beam splitter or a second oblique mirror face of the pyramidal mirror that directs the rotated light to the second (exit) polarizing filter. As the second polarizing filter is aligned to the rotated angle of the polarization vector E' of the forward-propagating light, the E'-polarized light exits the MOKE optical interconnect with little loss of energy, impinging on the receiving optics of the optical device within the optical MCP.

As noted above, some of the coupled light may be reflected from the surfaces of the receiving optics within the package, such as a collimating lens, and may be backscattered toward the MOKE optical interconnect. The polarization E' of the backscattered light may be substantially maintained, permitting a portion of the backscattered light to pass back into the MOKE optical interconnect through the exit polarizing filter. The backscattered light may be directed toward the magnetic surface by reflection from internal mirrors, where E' may undergo a second rotation to E". In some embodiments, E' may be rotated by the same angle, whereby the polarization angle of E" may be double the angle E'. Doubly-rotated light may strike the entrance polarizing filter at an angle that is oblique or orthogonal to its polarization angle. By having an oblique angle, E"-polarized light may be substantially attenuated and prevented from coupling into the optical fiber or source optics. Advantageously, by mitigation of coupling of the backscattered light into the source optics, constructive and destructive interference due to interaction of the backscattered light with incoming optical signals may be suppressed or eliminated, substantially reducing bit error rates and potentially increasing signal bandwidth.

Where the plane of polarization of the incoming light is normal to the plane of the magnetic surface, the magnetic moment vector may be parallel to the polarization vector of the incoming light. MOKE configurations may be defined by the orthogonality of the polarization vector, the magnetic field vector (e.g., B, the magnetic flux vector) and direction (e.g., S, the Poynting vector) of the impinging light and the magnetic vector. For example, a MOKE configuration is defined to be "polar" if B is parallel to E and orthogonal to S.

In some embodiments, the magnetic moment B may be in-the plane of the surface and substantially orthogonal to the polarization vector E as the plane of polarization of the incoming light may be normal to the plane of the magnetic surface (e.g., parallel to the surface normal vector n). A magnetic moment vector B within the surface plane may be substantially orthogonal to both the normal direction E of polarized light and to S, the direction vector of the light propagation. For B parallel to S and orthogonal to E, the MOKE configuration is defined as "transverse".

In some embodiments, magnetic moment vector B may be substantially orthogonal to the plane of polarization E of the incoming light, but may also be parallel to the direction S of light propagation. The MOKE configuration may be defined as "longitudinal".

In some embodiments, the magnetic surface may be the surface of a film or foil comprising a ferromagnetic (e.g., hard magnetic) material, such as iron, nickel, cobalt or molybdenum in a deposited film or a thin foil having a permanent magnetic moment (e.g., a permanent magnet). In some embodiments, the film or foil comprises a magnetizable material that has no permanent magnetic moment B in the absence of an external magnetic field (e.g., H), but where a magnetic moment may be induced by an external magnetic field. The external magnetic field H may be generated by a coil of an electromagnet, as noted above. The coil may be located adjacent to the magnetic surface. Examples of magnetizable materials include permalloy materials, generally comprising iron-nickel alloys, and other suitable magnetizable (e.g., soft magnetic) materials.

The coil windings may be oriented to develop a B field in a desirable orientation relative to E and S of the incoming light, as described above, for polar, transverse or longitudinal operation of the MOKE interconnect. In some embodiments, the electromagnet comprises a ferromagnetic or ferrimagnetic core to enhance the generated B field.

According to some embodiments, an optical package comprises one or more MOKE optical interconnects coupled to receiving optics on microphotonic devices integrated into the optical package. Optical devices may include photonic integrated circuit (PIC) dies comprising photonic and optoelectronic components such as waveguides, resonators, optical switches, optical amplifiers, optical transceivers, discrete diode lasers, photodiodes and phototransistors. MOKE optical interconnects may by top coupled or alternatively edge coupled to the optical package. Individual MOKE optical interconnects according to embodiments disclosed herein may have an external optical fiber coupled to the input port. Optical fibers may transport optical signals to the optical package through a first MOKE optical interconnect. Optical fibers coupled to an output MOKE interconnect may transport optical signals from the optical package to an external optical network. For example, the external optical fiber may be coupled to an optical communications network, such as a subnetwork within a data center or inter-device rack connections.

In this disclosure, it is understood that the terms "over", "under", "above", "below", "upper", "lower", "top" and "bottom" have the usual structural meanings, referring to relative vertical positions within structural embodiments and to their immediate environment as viewed within the associated figures. Similarly, the terms "left", "right", "side" and "sideways" have the usual structural meanings, referring to relative horizontal positions within structural embodiments and within their immediate environment as viewed within the associated figures.

The terms "substantial" or "substantially" are used within this disclosure to mean "the greater part of", "mostly" or "mostly to fully". For example, "substantially" may qualitatively indicate a measure within 10% of a quantifiable attribute, with the possibility that the measure may range from 90% to 100% of the quantifiable attribute.

Views labeled "cross-sectional", "profile", "plan", and "isometric" correspond to orthogonal planes within a cartesian coordinate system. Thus, cross-sectional and profile views are taken in the x-z plane, plan views are taken in the x-y plane, and isometric views are taken in a 3-dimensional cartesian coordinate system (x-y-z). Where appropriate, drawings are labeled with axes to indicate the orientation of the figure.

FIG. 1A illustrates a cross-sectional view in the x-z plane of MOKE optical interconnect 100, according to some embodiments of the disclosure.

In the illustrated embodiment, MOKE optical interconnect 100 comprises MOKE module body 101, endcaps 102 and 103, comprising optical fiber ports 104 and 105 and lenses 106 and 107 within optical coupling ports 104 and 105, respectively. In some embodiments, MOKE optical interconnect 100 comprises a single lens (e.g., lens 106 or 107) within one of optical coupling ports 104 or 105. In some embodiments, at least one of optical coupling ports 106 and 107 may be configured to receive an optical fiber end connector. Lens 106 and/or 107 may be a collimating lens, whereby divergent light emerging from an optical fiber may be directed into a collimated beam. One of optical coupling ports 106 and 107 may be configured to mate with a receiving port on an optical package. In some implementations, optical packages have an integrated lens within a receiving port for an optical fiber. To accommodate such implementations, the second lens 106 or 107 may be omitted.

Lens 106 and 107 may comprise amorphous silica, optical borosilicate glasses or optical polymers.

MOKE module 101 comprises polarizing filters 108 and 109 adjacent to lenses 106 and 107, respectively. Polarizing filter 109 may have a different polarization angle with respect to polarizing filter 108. For example, polarization angles may differ by ±45° (due to MOKE rotation of incoming light, as described below) between polarizing filters 108 and 109. Between polarizing filters 108 and 109 is pyramidal mirror 110, comprising oblique mirror faces 111 and 112. MOKE medium 113 is opposite pyramidal mirror 110. In some embodiments, MOKE medium 113 may comprise a magnetic material having a permanent magnetic moment (e.g., a hard-magnetic material comprises by a permanent magnet). Exemplary materials include, but are not limited to, ferromagnetic pure metals or alloys comprising iron, cobalt, nickel, neodymium, gadolinium, samarium or dysprosium, where the material has a permanent magnetic moment.

In some embodiments, MOKE medium 113 may comprise a magnetizable material having a non-permanent magnetic moment (e.g., a soft magnet), where the material may develop a temporary magnetic moment in the presence of an external magnetic field H. Exemplary magnetizable materials may include, but are not limited to, ferromagnetic materials such as permalloys and mu-metals (Fe/Ni alloys), iron-silicon alloys, amorphous and nanocrystalline iron, iron-nickel and iron-cobalt alloys, and ferrimagnetic materials such as soft ferrites (e.g., Mn—Zn or Mn—Ni ferrites). The magnetizable material may be in a film or foil, having a thickness ranging between 1 and 1000 microns or more. MOKE medium 113 may comprise reflective surface 114, where incoming polarized light may be reflected between oblique mirrors 111 or 112. Reflective surface 114 may be have a mirror-like finish for specular reflection of impinging light, or may have a semi-gloss or matt finish for more diffuse light reflection.

MOKE module body 101 may have a rectangular or circular cross section in the y-z plane. The illustrated embodiment is shown to be rectangular to accommodate flat internal components pyramidal mirror 110 and MOKE medium 113.

Figure 1B:
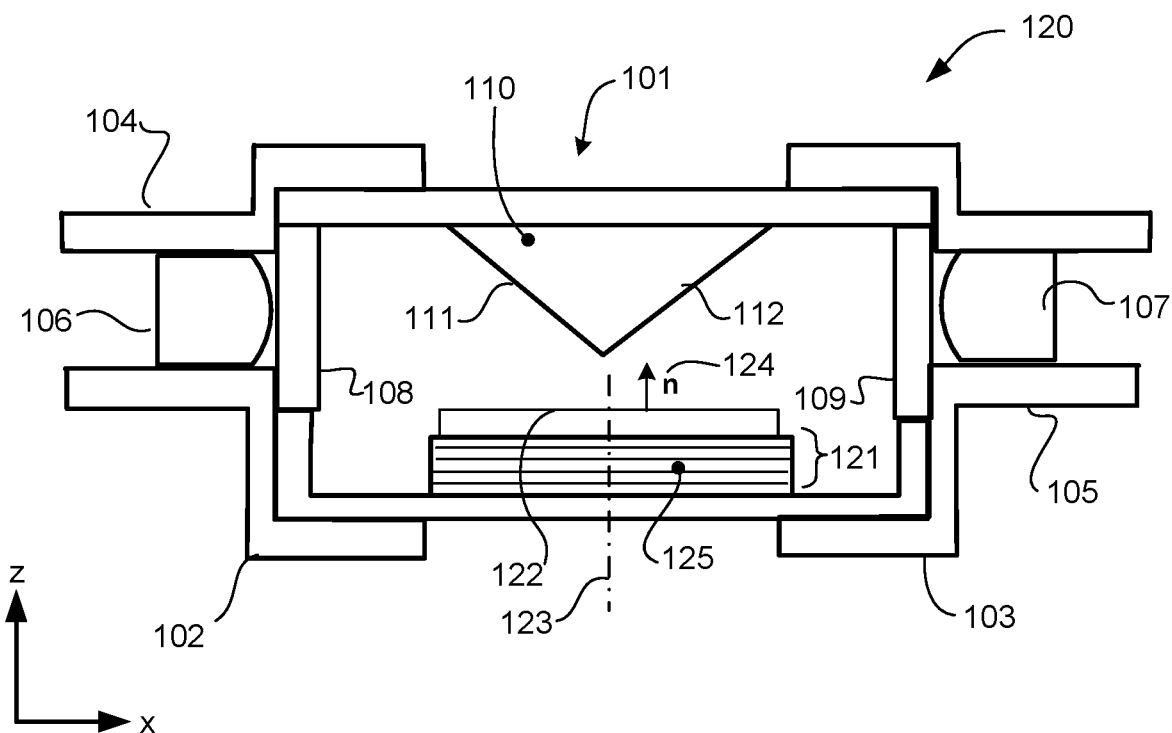
FIG. 1B illustrates a cross-sectional view in the x-z plane of a MOKE optical interconnect comprising an electromagnet, according to some embodiments of the disclosure.

FIG. 1B illustrates a cross-sectional view in the x-z plane of MOKE optical interconnect 120 comprising an electromagnet, according to some embodiments of the disclosure.

MOKE optical interconnect 120 comprises electromagnet coil 121 opposite pyramidal mirror 110. Reflective surface 122 may be located between pyramidal mirror 110 and electromagnet coil 121. In the illustrated embodiment, reflective surface 122 is adjacent to electromagnet coil 121. In some embodiments, reflective surface 122 may comprise a non-magnetic material, comprising a metal or a non-metal. Reflective surface 122 may have a mirror finish for specular reflection of impinging light, or a matt finish for diffuse reflection. In some embodiments, reflective surface 122 may comprise a magnetic or magnetizable material as described above.

Figure 1C:
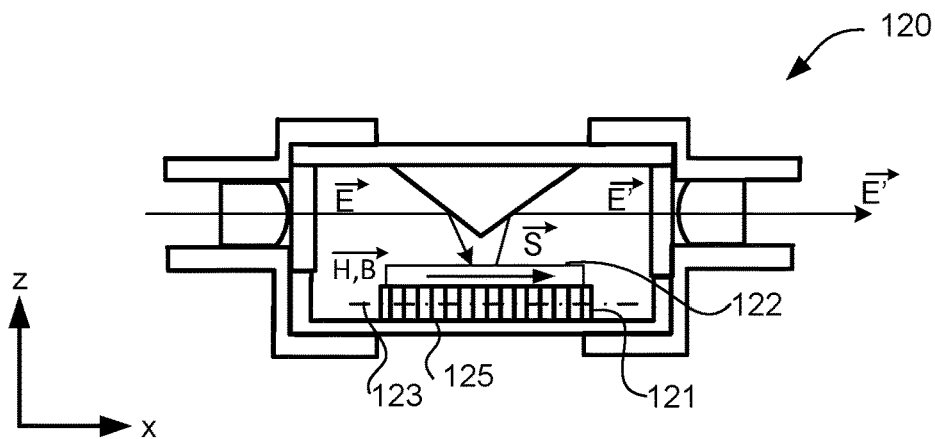
FIGS. 1C-1E illustrate cross-sectional views in the x-z plane of a MOKE optical interconnect comprising electromagnet coil having different orthogonal orientations, according to some embodiments of the disclosure.
Figure 1D:
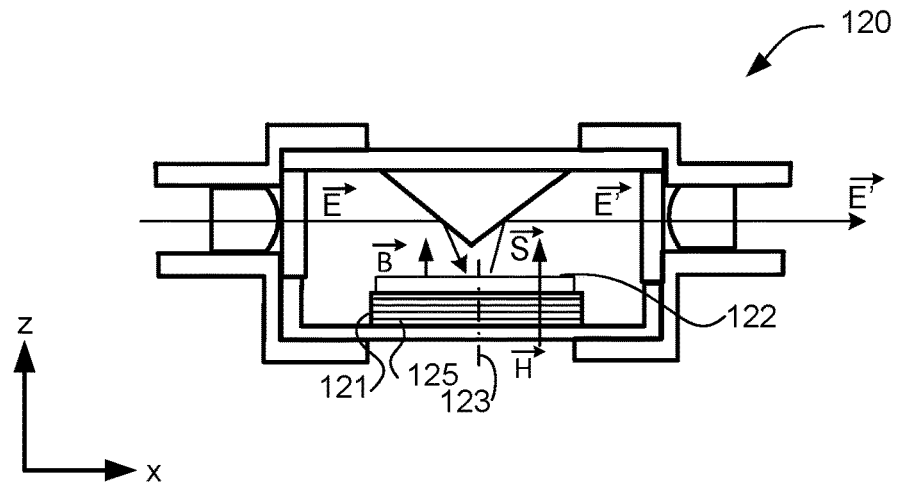
Figure 1E:
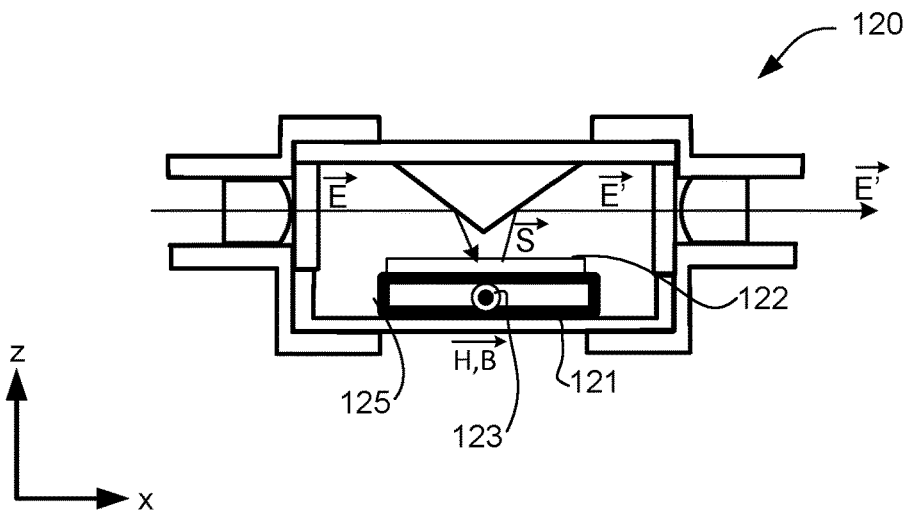

A magnetizable material may be magnetized by a magnetic field H generated by electromagnet coil 121 when a current is passed through its windings. In the illustrated embodiment, electromagnetic coil is oriented such that axis 123 of electromagnetic coil 121 is parallel to surface normal 124 of reflective surface 122. As described below, a magnetic field H generated by electromagnet coil 121 oriented as shown in FIG. 1B may be substantially parallel to surface normal 124. As shown in FIGS. 1C-1E, electromagnet coil 121 may have orthogonal orientations relative to surface normal 124 in some embodiments. The number of windings 125 of electromagnet coil 121 may be any suitable number depending on the magnitude of the H field required to sufficiently magnetize reflective surface 122. In some embodiments, electromagnet coil 121 may comprise a soft magnetic core to increase the magnetic flux field (B).

FIGS. 1C-1E illustrate cross-sectional views in the x-z plane of MOKE optical interconnect 120 comprising electromagnet coil 121 having different orthogonal orientations, according to some embodiments of the disclosure.

FIG. 1C illustrates electromagnet coil 121 comprising laterally oriented windings 125 wound along the x-axis. Electromagnet coil 121 may be a solenoid, for example. Coil axis 123 extends along the x-direction of the figure. The generated magnetic field H is parallel to the coil axis 123, and may generate a parallel magnetic moment B of a magnetizable material. The MOKE interaction with E and S of light impinging on surface 122 is longitudinal.

FIG. 1D illustrates electromagnet coil 121 comprising vertically oriented windings 125 and a coil axis 123 extending along the z-direction of the figure. Electromagnet coil may be a toroidal coil, for example, or a vertically mounted solenoid. The generated magnetic field H is orthogonal to S but parallel to E, leading to a polar MOKE interaction between B and E.

FIG. 1E illustrates electromagnet coil 121 comprising laterally oriented windings 125 and a coil axis extending along the y-direction of the figure. Electromagnet coil 121 may be a solenoid oriented along the y-axis. The generated magnetic moment B is orthogonal to both S and to E, leading to a transverse MOKE interaction between B and E.

Figure 2A:
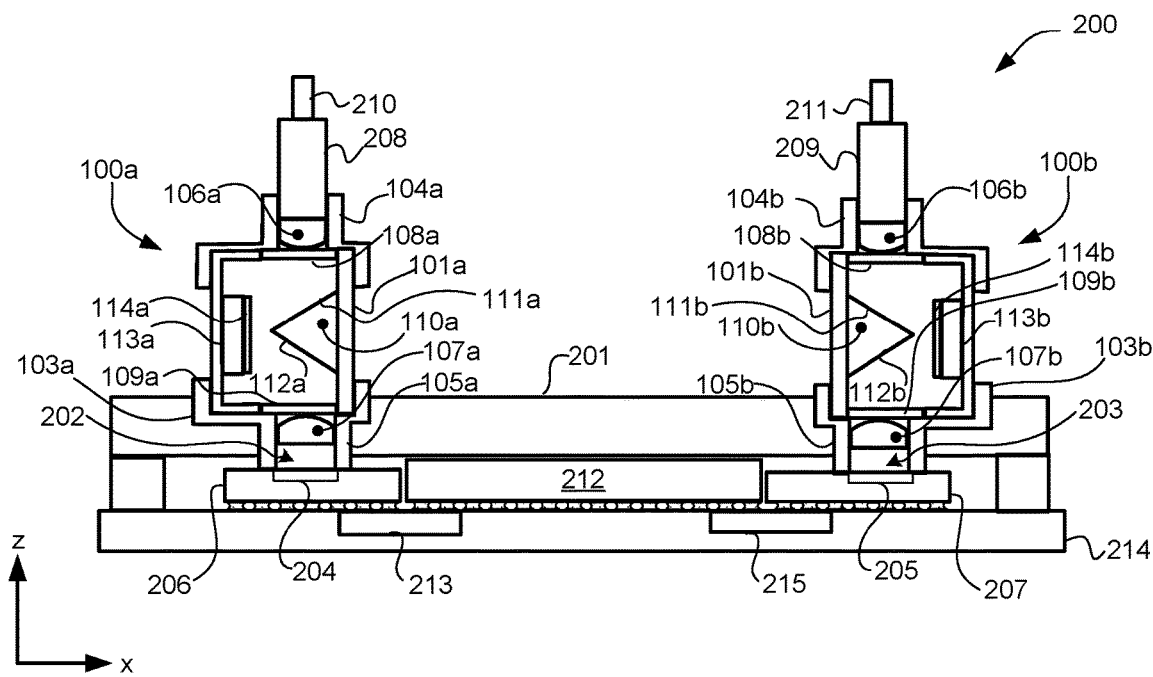
FIG. 2A illustrates a cross sectional view in the y-z plane of an exemplary implementation of MOKE optical interconnect on an optical package, according to some embodiments of the disclosure.

FIG. 2A illustrates a cross sectional view in the y-z plane of an exemplary implementation of MOKE optical interconnect 100 on optical package 200, according to some embodiments of the disclosure.

Optical package 200 comprises MOKE optical interconnects 100a and 100b vertically attached to optical package 200 at two locations over integrated heat spreader 201. In the illustrated embodiment, IHS 201 has at least two ports 202 and 203 through which MOKE optical interconnects 100a and 100b are optically coupled to coupling optics 204 and 205 on optical dies 206 and 207. Coupling optics 204 and 205 may comprise receiving and/or transmitting optical components. In some embodiments, optical dies 206 and 207 are optical chiplets comprising photonic components such as, but not limited to, optical gratings and waveguides (e.g., as part of coupling optics 204), and integrated optoelectronic devices such as ring resonators, Mach-Zehnder interferometers, optical switch networks, such as integrated diode lasers, light-emitting diodes (LEDs), semiconductor optical amplifiers (SOAs) and phototransistors.

Optical coupling ports 104 and 105 are in-line, enabling a vertical connection of end connectors 208 and 209 of optical fibers 210 and 211. The vertical orientation of MOKE optical interconnects 100a and 100b may advantageously enable a smaller footprint for optical package 200, enabling higher density platforms for optical packages. Optical die 206 is electronically coupled to integrated circuit (IC) die 212 through embedded bridge die 213 within substrate 214. Substrate 214 may comprise a build-up of organic layered dielectric film comprising polymer resins. For example, dielectric films may comprise polyimides, epoxy-phenol, benzocyclobutene, and polybenzoxazole resins. Bridge die 213 may enable electronic communication between optical die 206 and IC die 212 by routing converted optical data to IC die 212 through metallization on bridge die 213. IC die 212 may be a logic die, comprising a microprocessor, field-programmable gate array (FPGA), or an application-specific integrated circuit (ASIC).

During operation of optical package 200, incoming modulated light may be coupled into optical die 206 from optical fiber 210 through MOKE optical interconnect 100a. Optical signals may be transferred through lens 107a and received by coupling optics 204 on optical die 206. Optical signals may be converted to electronic signals through at least one of the optoelectronic devices mentioned above, which may be integrated on optical die 206. Optical data signals received by optical die 206 may be converted to electronic signals and transferred to IC die 213. The converted data may be processed on die 213. Processed electronic data may then be transferred to optical die 207 through embedded bridge die 215. Embedded bridge die 215 may be similar or substantially identical to bridge die 213. Optical die 207 may convert the electronic signals to outgoing optical signals, whereby the outgoing optical signals may be coupled into MOKE optical interconnect 100b through coupling optics 205 and lens 107b.

In some embodiments, MOKE optical interconnects 100a and 100b may be agnostic to signal direction, and either may be employed for one-way or two-way transfer of optical signals from optical package 200 to and/or from optical fibers 210 or 211, respectively. In some implementations, incoming optical signals may be conveyed to optical package 200 through optical fiber 211 and MOKE optical interconnect 100b. For example, in some implementations, MOKE optical interconnects 100a and 100b are dedicated to convey incoming and outgoing signals, respectively. In some implementations, MOKE interconnects 100a and 100b may be agnostic to signal direction, and alternatively transfer optical signals into and out of optical package 200.

MOKE optical interconnects 100a and 100b may be mounted on optical package as shown, for example by attaching end caps 103a and 103b, respectively, onto IHS 201, whereby optical coupling ports 105a and 105b may extend through coupling ports 202 and 203, as shown, enabling lenses 107a and 107b to be in proximity of coupling optics 204 and 205 on optical dies 206 and 207. End caps 103a and 103b may be attached to optical package 200 by gluing with a suitable adhesive directly to IHS 201 or to an organic encapsulant (not shown) around optical package 200 and embedding IHS 201. In some embodiments, IHS 201 is omitted. Coupling ports 202 and 203 may extend as openings through the encapsulant to exposed coupling optics 204 and 205 at the bottoms of ports 202 and 203. In some embodiments, a docking structure (not shown) for MOKE optical interconnects may be partially embedded within or glued onto IHS 201.or directly to an encapsulant. The docking structure may include a detent mechanism (e.g., a pin or clip) for removable retention of MOKE optical interconnects 100a and 100b within the docking structure.

During operation of optical package 200, incoming light may couple into one or both of MOKE modules 101a and/or 101b from one or both of optical fibers 210 and 211. For example, incoming light may couple into optical package 200 through MOKE optical interconnect 100a. Light may be collimated and/or focused through lens 106a, and pass through polarization filter 108a. Incoming light may be polarized according to the polarization angle of polarizing filters 108a and strike oblique mirror face 111a of pyramidal mirror 110a. Light reflecting off of oblique mirror face 111a may strike MOKE medium 113a, where it undergoes a rotation of the polarization vector E to polarization vector E' by MOKE interaction with the magnetic field B from a magnetic material within MOKE medium 113a. The angle of rotation due to MOKE interaction (e.g., polar, longitudinal or transverse) may depend on the orientation and magnitude of B, as described below. For example, vector E' may be rotated approximately ±45° from vector E. The rotated light may be reflected from reflective surface 114a to oblique mirror face 112a. Oblique mirror face 112a may subsequently redirect the rotated light to polarizing filter 109a. In some embodiments, polarizing filter 109a has a polarization angle that substantially is the same as the angle of E', permitting the rotated light to pass through polarizing filter 109a substantially unattenuated. Polarized light exiting MOKE module 101a may then be recollimated and/or focused by lens 107a to impinge on coupling optics 204 of optical die 206.

Figure 2B:
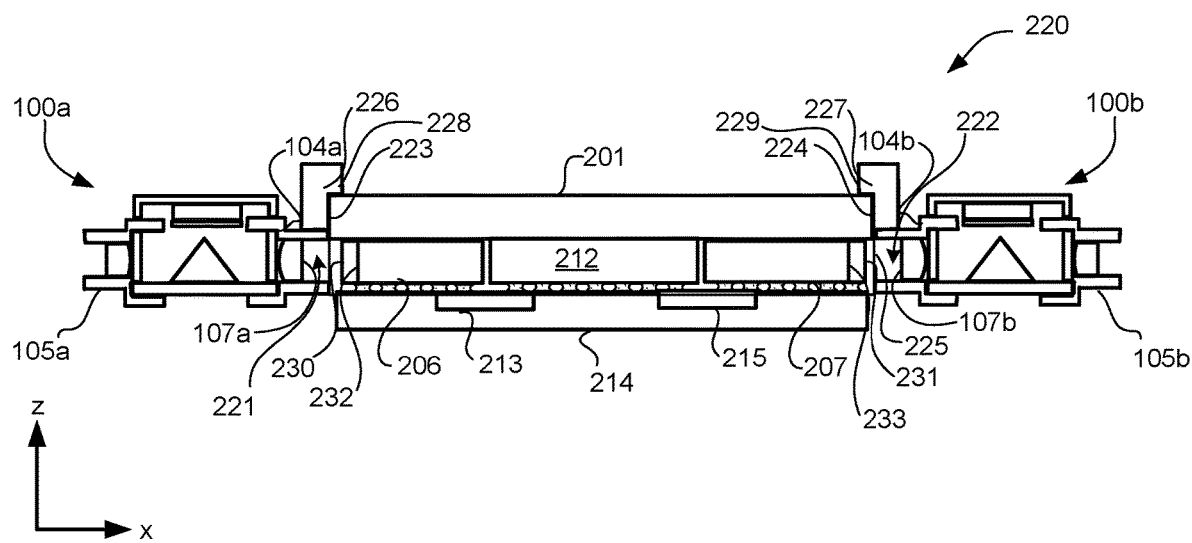
FIG. 2B illustrates a cross-sectional view in the x-z plane of an optical package having laterally mounted MOKE optical interconnects, according to some embodiments of the disclosure.

As the light must pass through regions of differing refractive index (e.g., between inorganic or organic solid materials and between transparent solids and air or gaseous ambient/vacuum), some unwanted reflection of the incoming light may occur from optical surfaces, backscattering light toward optical fiber 210. In particular, light may backscatter from surfaces of polarizing filter 109a, lens 107a and/or coupling optics 204. Backscattered light passing through MOKE module 101a may retrace the trajectory of the incoming light just described. If reflected from lens 109a, for example, the polarization angle (e.g., E') may be retained, permitting the light to pass into MOKE module 101a through (exit) polarizing filter 109a substantially unattenuated. The backscattered light may strike oblique mirror face 112a and be reflected toward MOKE medium 113a, where it may undergo a second rotation to a new polarization angle E" due to MOKE interaction with the B field of the magnetic material contained within MOKE medium 113a, as described above. As noted above, the angle of rotation due to MOKE interaction (polar, longitudinal or transverse) may depend on the orientation and magnitude of B, as described below. In some embodiments, and as described above, an electromagnet coil (e.g., as shown in FIG. 2B) may be optionally included to generate an H field, whereas MOKE medium may comprise a magnetizable material having a temporary magnetic moment B that may exist only in the presence of H. The angle of E" may be double the initial angle of polarization E (e.g., 2×E') of light passing through (entrance) polarizing filter 108a. Doubly rotated light may reflect off of MOKE medium 113a directly or from reflective surface 114a to oblique mirror face 111a, which may reflect it toward polarizing filter 108a.

Advantageously, backscattered light passing through polarizing filter 108a may be substantially attenuated due to the difference polarization angle of E" and that of polarizing filter 108a (e.g., E). For example, E and E" may differ by ±90°, whereby the doubly rotated light may be substantially orthogonal to polarizing filter 108a. Backscattered light may thus be limited or stopped completely from coupling back into optical fiber 210 through lens 106a. Any destructive/constructive interference and standing waves that would otherwise occur by interaction between incoming and backscattered light within optical fiber 210 may be substantially reduced or eliminated, enabling elimination or substantial reduction of bit errors and an increase of the data throughput rate to substantially 100%.

Referring to MOKE optical interconnect 100b, outgoing light may travel along a path that is the reverse of that taken by the incoming light travelling through MOKE optical interconnect 100a. During operation, outgoing optical signal light exiting optical package 200 through coupling optics 205 on optical die 207 may enter MOKE module 101b through lens 107b, passing though polarizing filter 109b into MOKE module 101b. Outgoing optical signal light may be substantially unpolarized modulated light, for example as emitted from a diode laser on optical die 207. Light passing through polarizing filter 109b may be polarized at an angle E or E', as described for the incoming optical signal light passing through polarizing filter 108a.

Polarized light traveling within MOKE module 101b toward optical fiber 211 may then strike oblique mirror face 112b after entering MOKE module 101b through polarizing filter 109b, and be reflected toward MOKE medium 113b. As described for MOKE module 113a, MOKE module 113b may comprise a magnetic material a permanent magnetic moment B as described above. The orientation of the magnetic moment B relative to direction S and angle of the polarization plane E of the impinging light may determine the interaction with the impinging light (e.g., polar, longitudinal or transverse). Polarized light having an initial angle E may then be rotated to an angle E'. E'-polarized light may subsequently reflect directly off of MOKE medium 113b or from a reflective surface 114b toward oblique mirror face 111b. From oblique mirror face 111b, light may be reflected toward polarizing filter 108b. In some embodiments, polarizing filter 108b may have a polarization angle parallel to E', permitting E'-polarized light to pass through substantially unattenuated to lens 106b. E'-polarized Light passing through lens 106b may be re-collimated and focused to match the numerical aperture of optical fiber 211, for efficient coupling thereto.

E'-polarized light may backscatter from lens 106b and reenter MOKE module 101b through polarizing filter 106b. In a manner similar to the suppression of backscattered light within MOKE module 101a, E'-polarized light may be reflected back to MOKE medium 113b, and undergo a second rotation to polarization angle E". E"-polarized light may be substantially stopped from passing back into optical die 207 by polarizing filter 109b, again suppressing interference with outgoing optical signals.

FIG. 2B illustrates a cross-sectional view in the x-z plane of optical package 220, having laterally mounted MOKE optical interconnects 100, according to some embodiments of the disclosure.

Optical package 220 may comprise lateral optical ports 221 and 222 extending through sidewalls 223 and 224. Sidewalls 223 and 224 may be sidewalls of IHS 201 or of encapsulant 225. MOKE optical interconnects 100a and 100b may be mounted laterally on sidewalls 223 and 224 optical package 220. MOKE optical interconnects 100a and 100b may attach to IHS 201 or encapsulant 225 optical package 220 by attachment structures 226 and 227, respectively. In some embodiments, attachment structures 226 and 227 may be extensions of coupling ports 104a and 104b, comprising overhangs 228 and 229, respectively. Overhangs 228 and 229 may aid in assembling MOKE optical interconnects 100a and 100b onto optical package 220. Overhangs 228 and 229 may stabilize MOKE optical interconnects 100a and 100b during assembly, and may be glued or snap-fitted to IHS 201, for example.

Optical coupling ports 104a and 104b on MOKE optical interconnects 100a and 100b may be adjacent to or within lateral optical ports 221 and 222, respectively. Lenses 107a and 107b may be adjacent to coupling optics 228 and 229 on optical dies 206 and 207, respectively, where coupling optics 230 and 231 may be adjacent to sidewalls 232 and 233 of optical dies 206 and 207, respectively. In the illustrated example, optical dies 206 and 207 are coupled to IC die 212 by bridge dies 213 and 215 embedded within substrate 214. It is understood that optical dies 206 and 207 may be integrated with IC die 212. For example, IC die 212 and optical dies 206 and 207 may be incorporated on a single monolithic die. In other implementations, embedded bridge dies 213 and 215 may be omitted, and inter-die electrical routing may be through metallization within substrate 214. Optical fiber coupling ports 105a and 105b may receive end connectors of optical fibers (not shown).

During operation of optical package 220, laterally-mounted MOKE optical interconnects 100a and 100b may function in a manner similar or identical to the functionality described above for the vertically mounted embodiment of optical package 200.

Figure 2C:
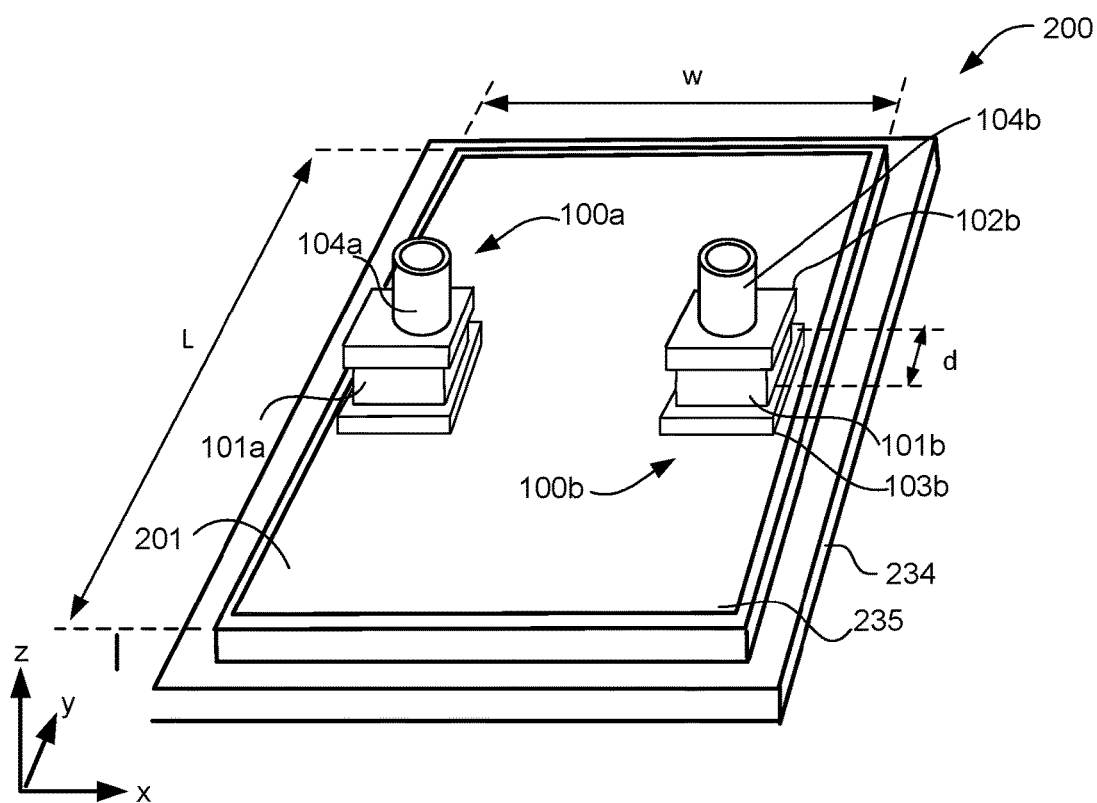
FIG. 2C illustrates an isometric view of an optical package comprising vertically-mounted MOKE optical interconnects, according to some embodiments.

FIG. 2C illustrates an isometric view of optical package 200, comprising vertically-mounted MOKE optical interconnects 100a and 100b, according to some embodiments.

Optical package 200 is shown coupled to printed circuit board (PCB) 234. Although not shown in the illustrated embodiment, optical package 200 may comprise a ball grid array or pin array, whereby optical package 200 is mounted within a socket that is coupled to PCB 234. MOKE optical interconnects 100a and 100b are mounted on opposite sides of optical package 200 over top surface 235. MOKE modules 101a and 101b are between end caps 102a/b and 103a/b, respectively. End caps 102b and 103b may be glued to surface 235. Optical ports extending vertically from end caps 102b and 103b into optical package 200 (e.g., optical ports 105a/b) may be aligned with coupling optics (e.g., coupling optics 204 and 205) of optical dies (e.g., optical dies 206 and 207) within optical package 200.

Optical package 200 may have dimensions L and w that may range between 25 and 75 mm. In some embodiments, MOKE modules 101a and 101b may have dimensions d that range between 5 and 15 mm to accommodate internal optical components of MOKE modules (e.g., pyramidal mirror 110, MOKE medium 113).

Figure 2D:
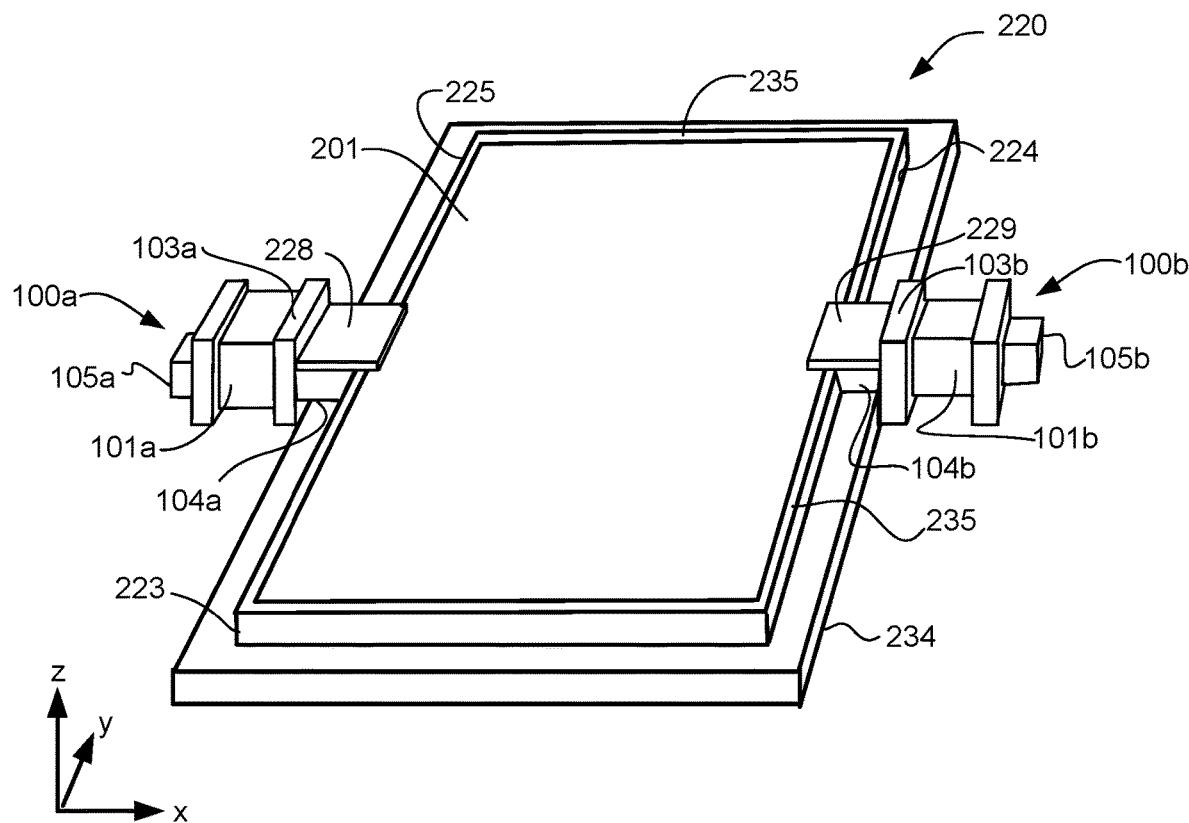
FIG. 2D illustrates an isometric view of an optical package comprising laterally coupled MOKE optical interconnects, according to some embodiments of the disclosure.

FIG. 2D illustrates an isometric view of optical package 220 comprising laterally coupled MOKE optical interconnects 100a and 100b, according to some embodiments of the disclosure.

Optical package 220 is shown coupled to PCB 234. MOKE optical interconnects 100a and 100b are attached laterally on sidewalls 223 and 224. Optical ports 104a and 104b extend from end caps 103a and 103b to sidewalls 223 and 224, respectively, or extend into optical package 220 (e.g., through optical ports 221 and 222). Optical ports 104a and 104b may align with coupling optics on optical dies within optical package 220 (e.g., laterally oriented coupling optics 230 and 231 on sidewalls 232 and 233 of optical dies 206 and 207, respectively). In some embodiments, overhangs 228 and 229 are attached to surface 235 by a suitable adhesive. In some embodiments, overhangs 228 and 229 are attached to surface 235 by a press fit method.

Dimensions of MOKE optical interconnects 100a and 100b may be similar to those mentioned above.

Figure 3A:
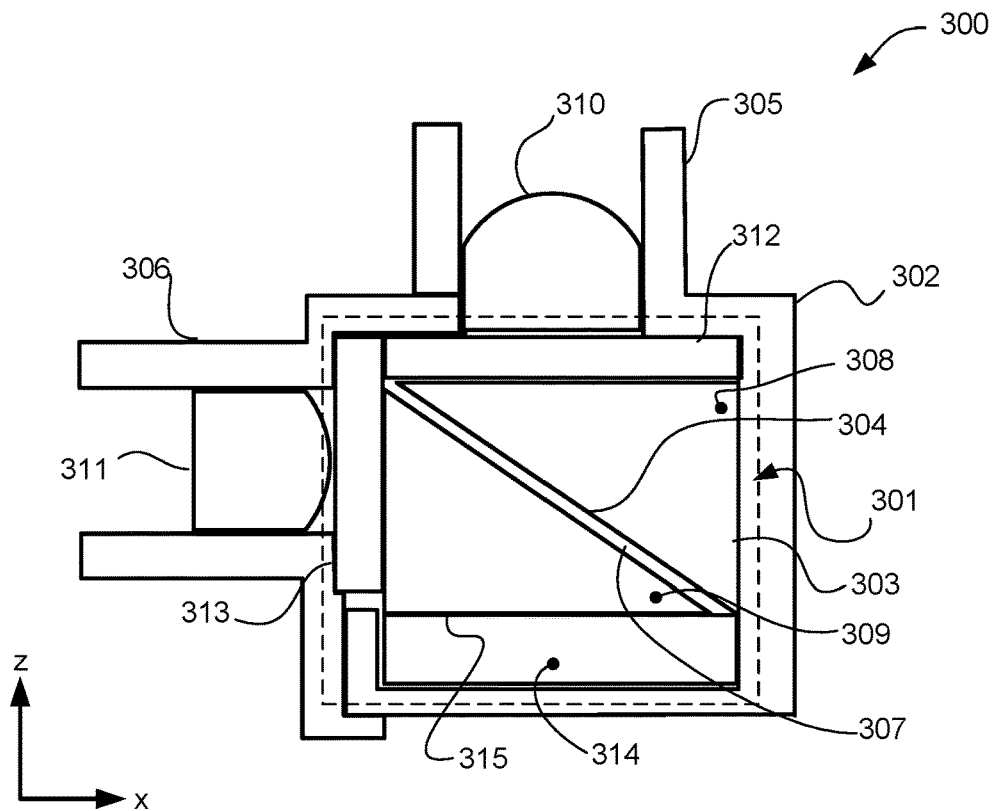
FIG. 3A illustrates a cross-sectional view in the x-z plane of a MOKE optical interconnect comprising a beam splitter, according to some embodiments of the disclosure.

FIG. 3A illustrates a cross-sectional view in the x-z plane of MOKE optical interconnect 300 comprising a beam splitter, according to some embodiments of the disclosure.

MOKE optical interconnect 300 comprises MOKE module 301 (delineated by the dashed enclosure), contained within casing 302. comprising beam splitter prism 303 having semi-mirrored surface 304 oriented at an oblique angle with respect to optical coupling ports 305 and 306, which may extend from casing 302 in orthogonal directions, as shown in the figure. Optical coupling ports 305 and 306 may be integral with casing 302. Beam splitter prism 303 may comprise two adjacent right-triangular prisms 308 and 309 interfaced along their hypotenuse comprising optical fused silica or borosilicate glass. Semi-mirrored surface 304 may coincide with an interface 307 extending along the interface between triangular prisms 308 and 309, comprising a thin metallic film (e.g., a silver film) or a dielectric material, permitting partial reflection of incident light. Interface 307 may extend between triangular prisms 307 and 308 at an oblique angle (e.g., 45°) with respect to optical coupling ports 305 and 306.

In some embodiments, one of the optical coupling ports (e.g., optical coupling port 305 or 306) may be configured as an input port to receive an end connector of an optical fiber, whereas the remaining optical coupling port may be configured as an output port attachable to a photonic package. In some embodiments, optical coupling ports 305 and 306 may comprise a polymeric material, such as, but not limited to, thermoplastic or thermosetting materials such as acrylic resins, epoxy resins, acrylonitrile butadiene styrene (ABS), polyamides (e.g., Nylon), polyether sulfone (PES), polyvinyl chloride (PVC), polycarbonates, polyetherimide (e.g. Ultem), polyurethanes, polyoxymethylene (POM; e.g., Delrin), polyether ether ketone (PEEK), polyphenylene sulfide (PPS), polystyrene or polyvinylidene fluoride (PVDF). In some embodiments, casing 302 comprises a metal such as, but not limited to, aluminum and alloys of aluminum, steel alloys (e.g., stainless steel) or copper.

Lenses 310 and 311 may be plano-convex lenses comprising an optical material as described above. Lenses 310 and 311 are within optical coupling ports 305 and 306, and immediately adjacent to polarizing filters 312 and 313, respectively. In the illustrated embodiment, polarizing filters 312 and 313 may be entrance and exit filters, respectively. Lens 310 may be configured to receive incoming light and to collimate it for entry into MOKE module 301 through polarizing filter 312 (entrance filter), as the planar side of lens 310 is immediately adjacent to polarizing filter 312, whereas the convex side of lens 310 faces the source of incoming light (e.g., a coupled optical fiber). With the convex side of lens 311 immediately adjacent to polarizing filter 313, lens 311 may be configured to receive outgoing light passing through polarizing filter 313 (exit filter) and collimate it for entry into the receiving optics of an optical package (not shown).

Polarizing filters 312 and 313 may have polarization angles rotated relative to one another. For example, polarizing filter 313 may have a polarization angle that is approximately ±45° relative to the polarization angle of polarizing filter 312. The polarization angle of the exit filter (e.g., polarizing filter 312) may substantially match that of E of the exiting light, after reflection from and rotation by MOKE medium 314 during operation of MOKE optical interconnect 300. In some embodiments, MOKE medium 314 may comprise a magnetic or magnetizable material as described above. MOKE medium 314 may comprise reflective surface 315, having a mirror finish for specular reflection of impinging light or a matt finish for diffuse reflection of impinging light.

Figure 3B:
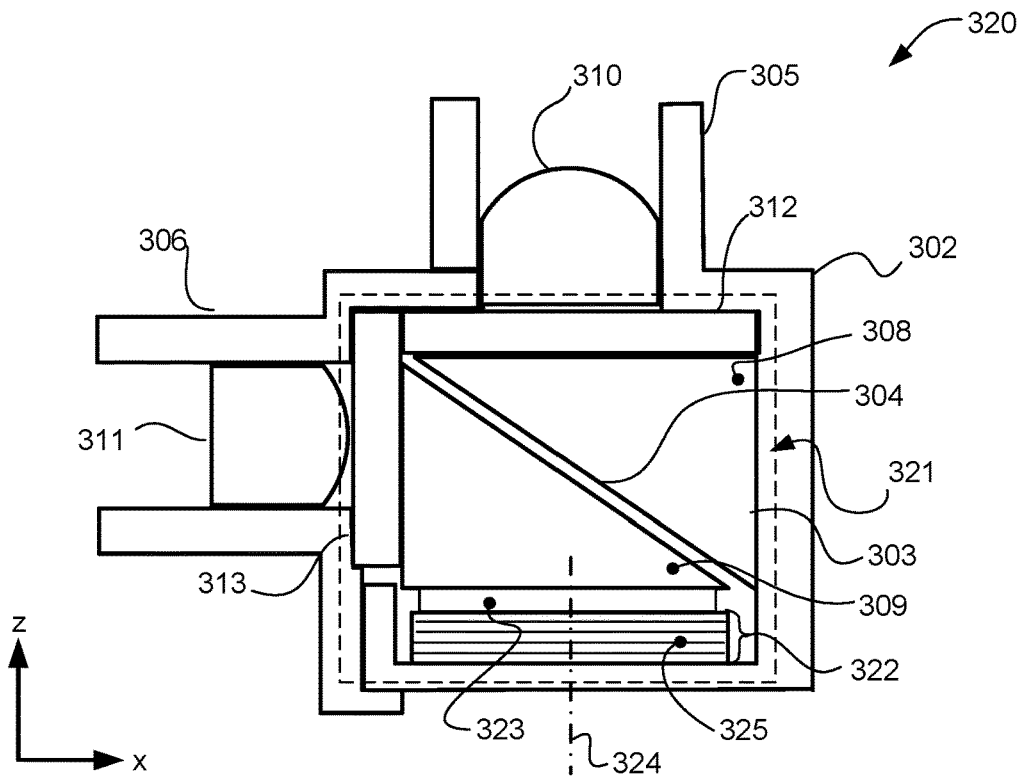
FIG. 3B illustrates a cross-sectional view in the x-z plane of a MOKE optical interconnect comprising a beam splitter and electromagnet coil, according to some embodiments of the disclosure.

FIG. 3B illustrates a cross-sectional view in the x-z plane of MOKE optical interconnect 320 comprising a beam splitter and electromagnet coil, according to some embodiments of the disclosure.

MOKE optical interconnect 320 comprises MOKE module 321. MOKE module 321 comprises electromagnet coil 322 adjacent to reflective surface 323. In the illustrated embodiment, coil axis 324 is orthogonal to the plane of reflective surface 323. In some embodiments, electromagnet coil 322 may have the orientation of coil axis 324 substantially parallel to the plane of reflective surface 323 as noted above, for example, extending along the x-axis or the y-axis of the figure. The particular orientation of coil axis 324 may in part determine the operational configuration (e.g., polar, longitudinal or transverse) of MOKE optical interconnect 320. The number of windings 325 of electromagnet coil 322 may depend on the H field magnitude required for sufficient magnetization of reflective surface 323 during operation of MOKE optical interconnect 320. The H field magnitude may depend on the magnitude of electrical current flowing through windings 325. The thickness (or diameter) of windings 325 may be adjusted to accommodate the necessary current magnitude. In some embodiments, electromagnet coil 322 may have a flat or planar configuration (e.g., a pancake coil). In some embodiments, a magnetic core (not shown) may be included within windings 325 of electromagnet coil 322 for enhancement of magnetic flux field B.

Figure 4A:
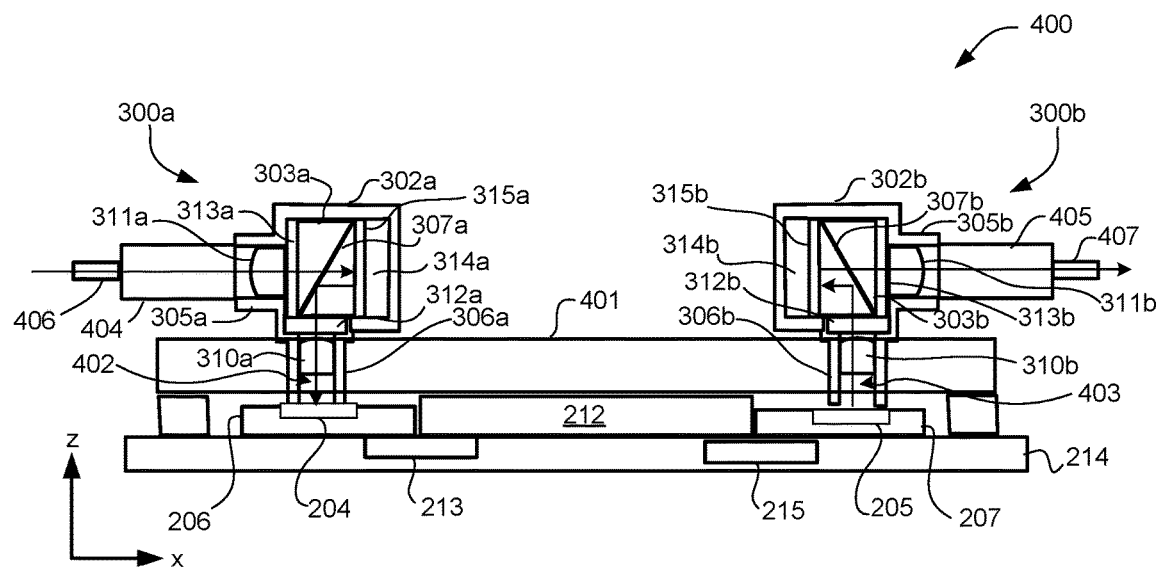
FIG. 4A illustrates a cross-sectional view in the x-z plane of an optical package comprising top-mounted MOKE optical interconnects, according to some embodiments of the disclosure.

FIG. 4A illustrates a cross-sectional view in the x-z plane of optical package 400, comprising top-mounted MOKE optical interconnects 300a and 300b, according to some embodiments of the disclosure.

Optical package 400 is substantially the same as optical package 200 shown in FIG. 2A. In the illustrated embodiment, top-mounted MOKE optical interconnects 300a and 300b are mounted on opposite sides of IHS 401. IHS 401 may comprise optical ports 402 and 403, through which optical coupling ports 306a and 306b extend from casings 302a and 302b, respectively.

Optical coupling ports 305a and 305b may receive optical fiber end fittings 404 and 405, respectively, coupling light into or from optical fibers 406 and 407. Following the path taken by incoming light shown by the arrows drawn in the figure, unpolarized and modulated light entering MOKE optical interconnect 300a may pass through lens 311a, which may collimate and focus light exiting optical fiber 406 onto polarizing filter 313a. Polarizing filter 313a polarizes the light according to its polarization angle. For example, polarizing filter 313a may polarize the electric field of the incoming light to an angle E. E-polarized light passes through beam splitter prism 303a, impinging on partial mirror 307a and reflecting a portion of the E-polarized light toward MOKE medium 314a. Magnetic medium 314a comprises a material having a permanent magnetic moment as described above, which interacts in a polar, longitudinal or transverse MOKE configuration with the impinging light, causing its polarization angle to rotate, for example, rotating the plane of polarization of the electric field vector E to an angle E'. In some embodiments, MOKE medium 314a is at least partially replaced or supplemented by an electromagnet coil, such as electromagnet coil 322 shown in FIG. 3B. The electromagnet coil may have an axial orientation that is orthogonal or parallel to the polarization angle E and the direction S of the impinging light. The H field generated by the electromagnet coil may directly interact with the impinging light, or magnetize a magnetizable material comprised by MOKE medium 314a, as described above. The H-field, proportional to the number of windings and the magnitude of current flowing through them, causes the E-polarized light to rotate to and angle E'. Reflective surface 315a may be present, causing the E'-polarized light to reflect back toward partial mirror 307a.

Still referring to the light path through MOKE optical interconnect 300a, E'-polarized light is reflected from surface 315a of MOKE optical interconnect 300a back towards partial mirror 307a, which reflects it towards to polarizing filter 312a. Polarizing filter 312a may have a polarization angle that is parallel to E', permitting E'-polarized light to pass through polarizing filter 312a substantially unattenuated. E'-polarized light exiting MOKE optical interconnect through lens 310a may be collimated and refocused to impinge on top plane coupling optics 204 on optical die 206.

As noted above, any backscattered light reflected towards polarizing filter 312a may retain its polarization angle E', and reenter MOKE optical interconnect 300a through polarizing filter 312a. Reentrant light may retrace the same optical path as the incoming light, reflecting from partial mirror 307a to MOKE medium 314a. Impinging E'-polarized light may be rotated to an angle E", which may be double the angle E'. E"-polarized light is reflected back to partial mirror 307a, which reflects it again toward polarizing filter 313a. E"-polarized light may be oblique orthogonal to the polarization angle of polarizing filter 313a. For example, E'-polarized light may have an angle that is ±45° with respect to the polarization angle E of polarization filter 313a. A double rotation to angle E" may cause E"-polarized light to be orthogonal to polarization filter 313a, where E"'-polarized light passing through toward optical fiber 406 may be substantially attenuated and prevented from coupling back into optical fiber 406. Advantageously, interference with incoming optical signals may be substantially reduced or eliminated by MOKE optical interconnect 300a.

MOKE optical interconnect 300b may couple outgoing light from optical die 207 through coupling optics 205. Following the path taken by outgoing light through MOKE optical interconnect 300b as indicated by the arrows in the figure, unpolarized modulated light emerging from coupling optics 205 passes through lens 310b, where it may be collimated and focused onto polarizing filter 312b. Outgoing light passing through polarizing filter 312b may be polarized to an angle E. E-polarized light may strike partial mirror 307b, where a portion of it may be reflected toward MOKE medium 314b. Interaction with the magnetic flux field B in the vicinity of MOKE medium 314b may rotate impinging light to an angle E'. As described above, the amount of rotation depends on the magnitude and orientation of B, which may be the same as caused by MOKE medium 314a.

Reflection from surface 315b of MOKE medium 314b directs E'-polarized light toward partial mirror 307b, which reflects the E'-polarized toward polarizing filter 313b. E'-polarized light may pass through polarizing filter 313b substantially unattenuated, coupling into optical fiber 407 through lens 311b.

Some of the outgoing E'-polarized light may be backscattered from lens 311b or other surfaces and may reenter MOKE optical interconnect 300b through polarizing filter 313b. Some of the backscattered light may follow the optical path delineated in the figure. Any light impinging on MOKE medium surface 315b may be rotated, for example, to an angle E". As noted above, E"-polarized light reaching polarizing filter 312b may be substantially attenuated in passage through the optical element, substantially limiting or eliminating coupling of any backscattered light into optical package 400.

Figure 4B:
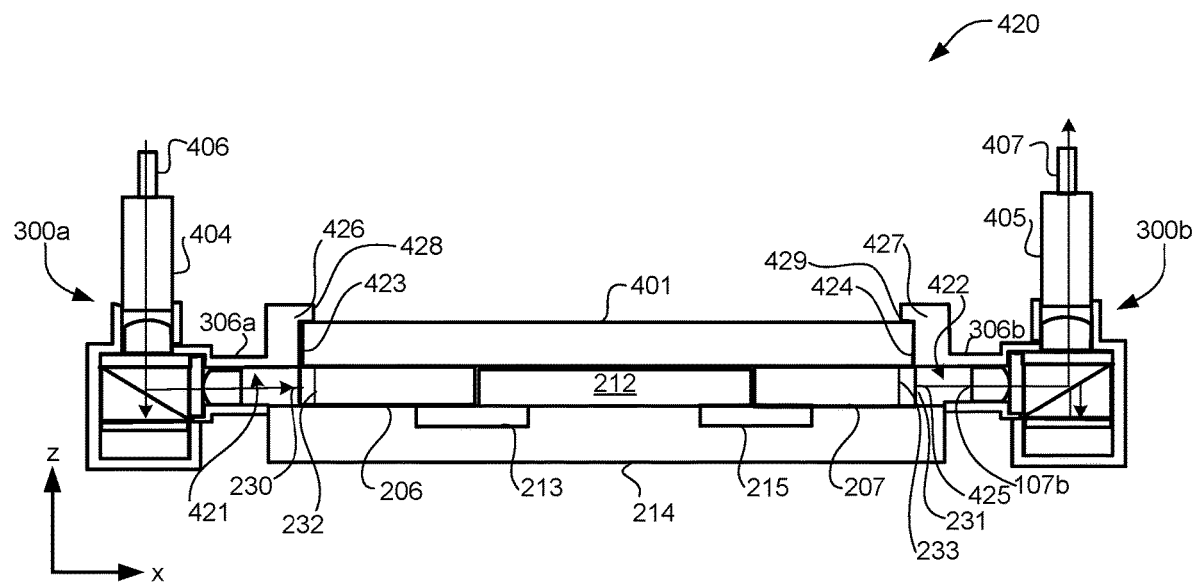
FIG. 4B illustrates a cross-sectional view in the x-z plane of an optical package comprising lateral-mounted MOKE optical interconnects, according to some embodiments of the disclosure.

FIG. 4B illustrates a cross-sectional view in the x-z plane of optical package 420, comprising lateral-mounted MOKE optical interconnects 300a and 300b, according to some embodiments of the disclosure.

In the illustrated embodiment, optical package 420 comprises MOKE optical interconnects 300a and 300b mounted laterally on sidewalls 423 and 424 of IHS 401. In some embodiments, optical package 420 comprises an encapsulant 425 that covers IHS sidewalls 423 and 424. Attachment structures 426 and 427 comprise overhangs 428 and 429 that may be glued onto HIS 401, or attached by a press fit. As described above for overhangs 228 and 229, overhangs 428 and 429 may aid in package assembly, whereby overhangs 428 and 429 may stabilize MOKE optical interconnects 300a and 300b during attachment to optical package 400.

Optical coupling ports 306a and 306b may be aligned with optical ports 421 and 422 on optical package 400. Optical ports 421 and 422 may be openings adjacent to coupling optics 230 and 231 on optical dies 206 and 207. In the illustrated embodiment, optical dies 206 and 207 are electrically coupled to IC die 212 by bridge dies 213 and 215 embedded within substrate 214. As noted above, IC die 212 may have integrated optical and optoelectronic components, whereby IC die 212 and optical dies 206 and 207 may be integrated into a single monolithic die.

During operation of optical package 420, MOKE optical interconnects 300a and 300b may be employed in tandem for one-way transfer of optical signals from optical package 400. For example, MOKE optical interconnect 300a may couple incoming light from optical fiber 404 into optical package 420, while MOKE optical interconnect 300b may couple outgoing light from optical package 400 to optical fiber 405 as depicted in the figure. Arrows indicate exemplary paths that incoming and outgoing light may take through MOKE optical interconnects 300a and 300b, generally as described above for optical package 400.

Figure 5:
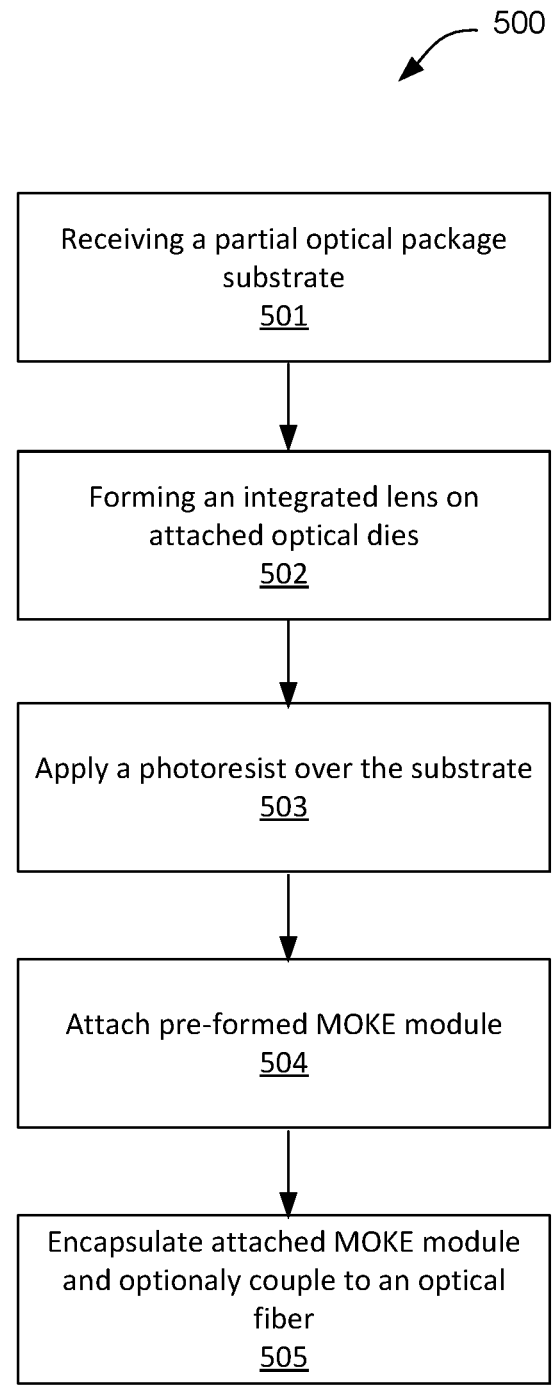
FIG. 5 illustrates an exemplary process flow chart for making an optical package comprising semi-integrated MOKE optical interconnects, according to some embodiments of the disclosure.

FIG. 5 illustrates exemplary process flow chart 500 for making an optical package comprising semi-integrated MOKE optical interconnects, according to some embodiments of the disclosure.

At operation 501, an optical package is received in-process (e.g., as a partially completed package substrate). The optical package may be received as a substrate comprising one or more semiconductor dies attached to and/or embedded within a dielectric material. The optical package may be received as multiple unsingulated partially complete package substrates carried on a polymer PCB board panel or glass, ceramic or polymer wafer. Processing of the substrates may be performed in subsequent operations at wafer level. Incomplete package substrate(s) may comprise optical dies and embedded bridge dies coupled to the optical dies and an electronic IC die, such as optical dies 206 and 207 coupled to IC die 212 by bridge dies 213 and 215, as shown in FIG. 2A. Optical dies may comprise coupling optics on the top surface for vertical coupling or on sidewalls for lateral coupling to an external optical fiber. Coupling optics may include integrated lenses or diffraction gratings for coupling light into integrated waveguides on the optical dies. In the example, coupling optics may not be integrated onto the optical dies at this stage.

At operation 502, coupling optics may be formed or attached to the optical die(s). For example, a lens may be integrated onto the optical die(s) by deposition of a suitable polymeric optical material onto a receiving location on the top surface of the optical die(s). The optical material may be deposited as an uncured viscous liquid onto the optical die(s), for example, through an opening formed in dielectric material covering the die. The polymeric liquid may naturally take on the shape of a convex lens by surface tension before hardening. Hardening may be facilitated by photocuring or by heat curing, for example by ultraviolet or infrared laser light shined on the uncured material. An example of a suitable liquid material for formation of an integrated lens is SU-8 negative-tone photoresist, comprising an epoxy. Alternatively, a pre-formed lens may be carried to the location and inserted into an opening over the receiving portion of the top of the optical die(s). A robotic pick-and-place tool may be employed for precise positioning and insertion of pre-formed lenses onto the optical die(s).

At operation 503, a photoresist material may be deposited over the substrate dielectric, covering the integrated lens and other exposed components on the substrate. The photoresist material may be patterned to define openings over the integrated lens(es), and openings may be formed to expose the integrated lenses and surrounding substrate dielectric material.

At operation 504, one or more pre-formed MOKE modules (e.g., MOKE module 101 in FIG. 1A or 301 in FIG. 3A) as precursors to complete MOKE optical interconnects may be attached directly to the substrate dielectric material that is exposed during formation of the openings in the photoresist layer over the integrated lens(es) in the previous operation. Pre-formed MOKE modules may comprise a casing having attachment structures that stabilize the MOKE modules. In some embodiments, the pre-formed MOKE modules have at least one end cap that has attachment structures, and an optical coupling port (e.g., optical coupling port 105, FIG. 1A). For example, the pre-formed MOKE module may have an end cap similar to one of end caps 102 and 103 (FIG. 1A). A pick-and-place tool may be employed to precisely insert the MOKE modules into position over integrated lenses. Prior to insertion of the one or more MOKE modules, a suitable adhesive may be deposited onto the exposed dielectric as a curable viscous liquid by a dispensing tool. Alternatively, a solid adhesive may be incorporated onto attachment structures of the MOKE module, and activated after the MOKE modules are attached, for example by a thermal treatment.

At operation 505, the attached MOKE modules may be encased in a suitable encapsulant, such as an epoxy to complete the MOKE optical interconnect. An end cap having an optical coupling port (e.g., end cap 105) for coupling an optical fiber may also be attached prior to encapsulation. After completion of the encapsulation process, an optical fiber may be attached.

FIGS. 6A-6G illustrate cross-sectional views in the x-z plane of the exemplary process flow summarized in FIG. 5 for fabrication of optical package 600a and alternatively optical package 600b, comprising a semi-integrated MOKE optical interconnect, according to some embodiments of the disclosure.

Figure 6A:
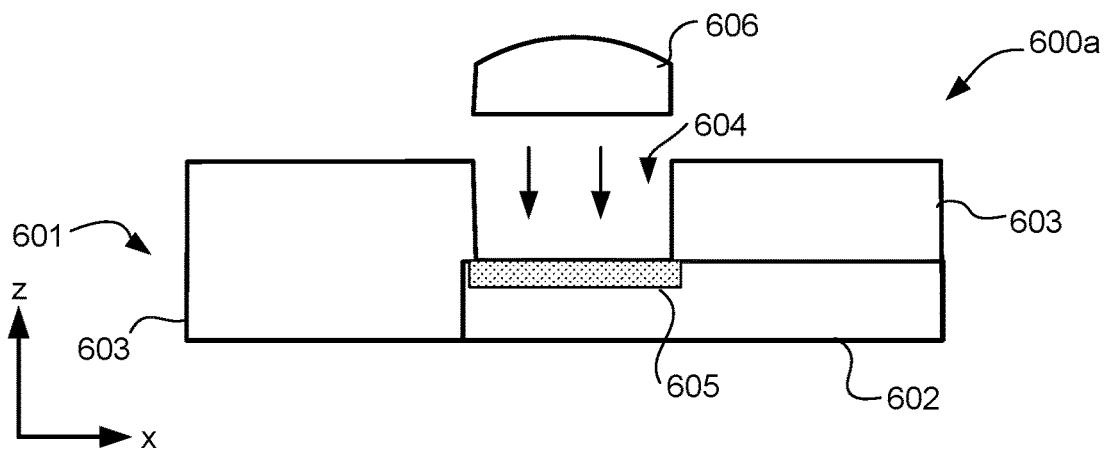
FIGS. 6A-6G illustrate cross-sectional views in the x-z plane of the exemplary process flow summarized in FIG. 5 for fabrication of an optical package comprising a semi-integrated MOKE optical interconnect, according to some embodiments of the disclosure.

In FIG. 6A, a received optical package substrate 601 comprises one or more optical dies 602 on or within package dielectric 603. For example, optical die 602 is embedded within package dielectric 603. Package substrate 601 may be processed in previous operations to form openings 604 within dielectric 603, over optical coupling portion 605 of optical die 602. Optical coupling portion may comprise optics to launch light into photonic and optoelectronic structures such as waveguides on optical die 602, or to couple light from photonic and optoelectronic structures to optical fibers. Optical die 602 may comprise optoelectronic devices, described above, that convert optical signals to electronic signals and vice-versa.

A polymeric or inorganic collimating/focusing lens 606 may be inserted into opening 604 and integrated into optical package substrate 601 by dispensing a suitable viscous liquid, such as but not limited to a negative-tone photoresist material (e.g., SU-8) or another suitable uncured polymer (or ceramic/composite gel). Once dispensed, the liquid may form a plano-concave lens naturally by surface tension. A curing process may be initiated by illumination by a laser source, for example, shining ultraviolet or infrared light onto the uncured lens to transform it to a solid optical material. Alternatively, a preformed lens 606 may be inserted into opening 604 by a pick-and-place operation, employing a robotic arm, for example.

Figure 6B:
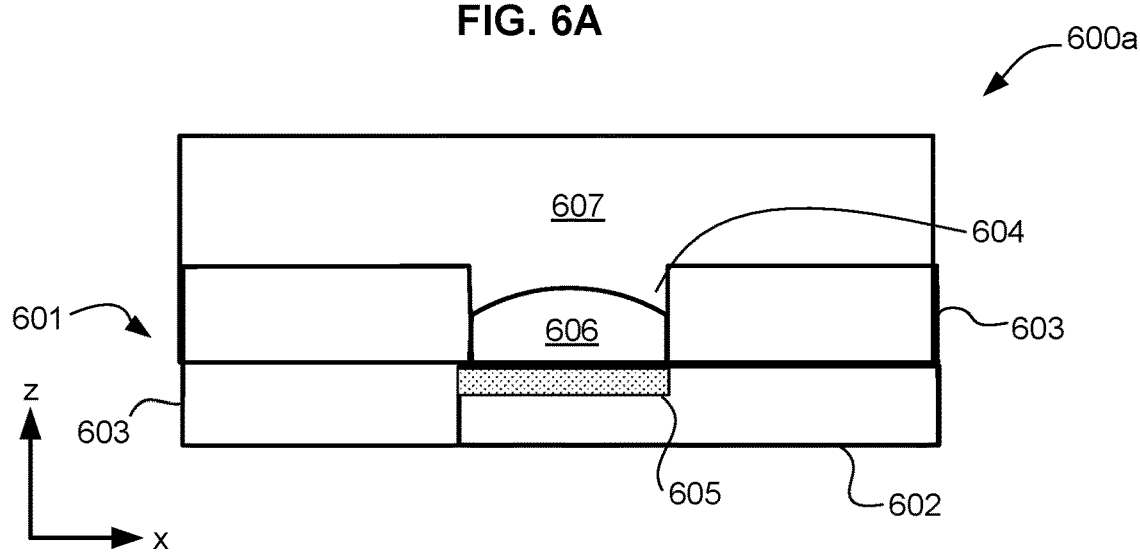
Figure 6C:
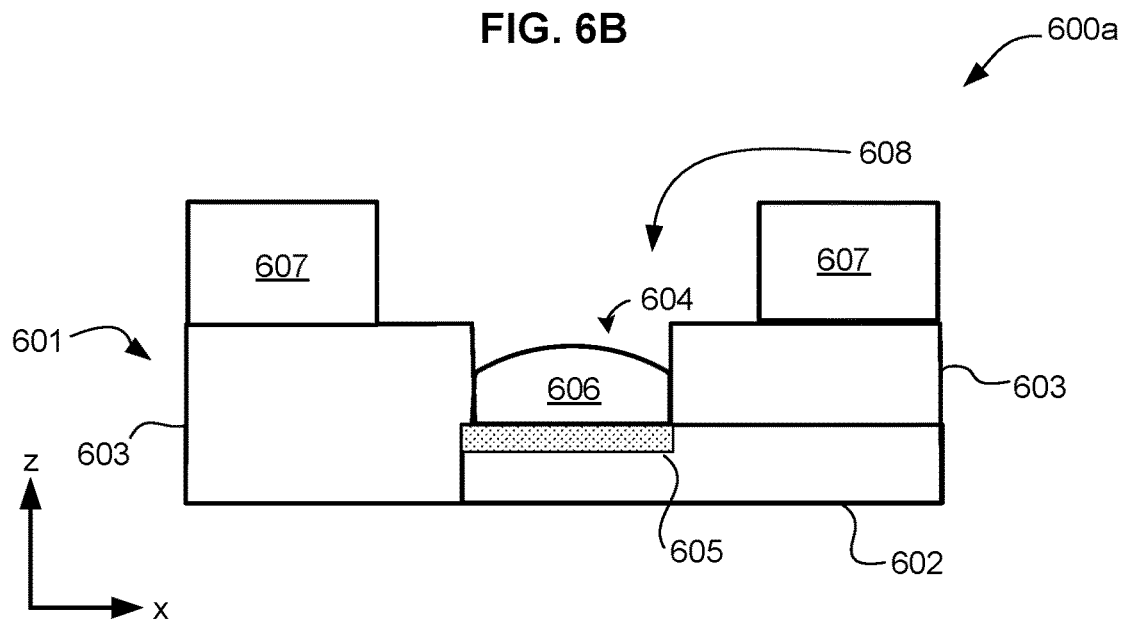

In FIGS. 6B and 6C, a photoresist or other photosensitive material 607 is deposited over package substrate 601, covering opening 604 and integrated lens 606. Photoresist 607 may be applied to form an additional dielectric layer, or as a sacrificial film to protect exposed structures on package substrate 601 during the MOKE optical interconnect attachment process. Photoresist 607 may be patterned to form openings 608, as shown in FIG. 6C, exposing integrated lens 606 and surrounding package dielectric 603.

Figure 6D:
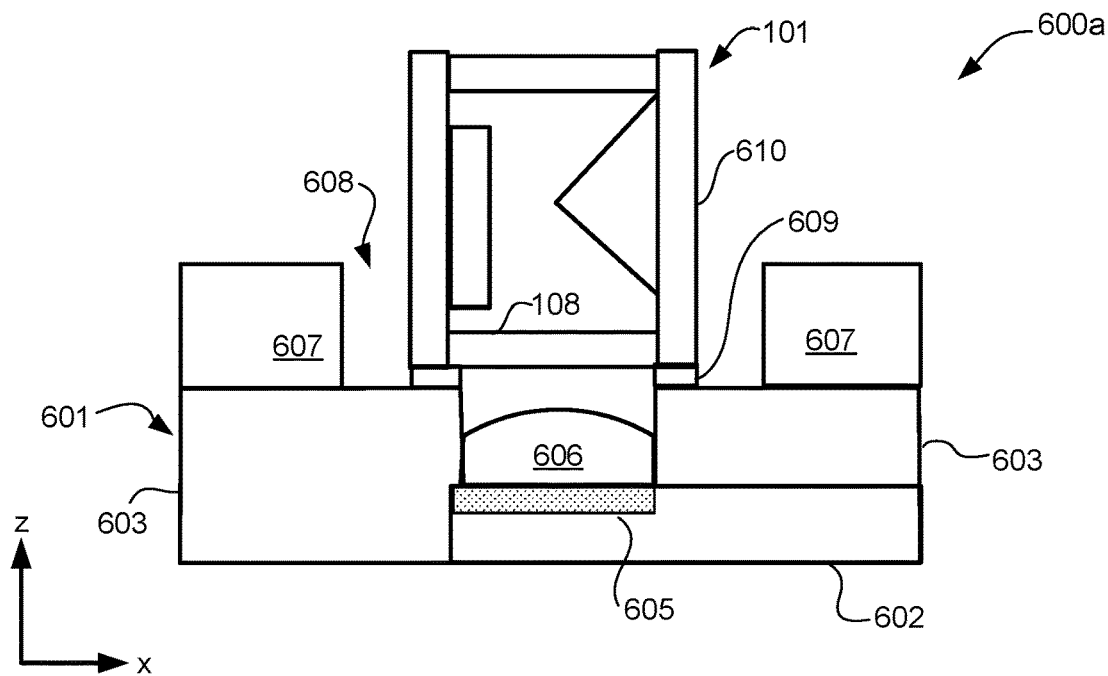

In FIG. 6D, pre-formed MOKE module 101 may be inserted into opening 608 in photoresist 607. Adhesive 609 may be dispensed as a viscous liquid onto exposed dielectric 603 within opening 608, adjacent to integrated lens 606. Alternatively, MOKE module 101 may have adhesive pads on attachment structures, for example, on the base of MOKE module casing 610. MOKE module 101 may be inserted with micron precision into opening 608 by an automated pick-and-place tool. MOKE module 101 may be positioned such that polarizing filter 108 is aligned over integrated lens 606. MOKE module 101 may be adhered to package dielectric 603 by photo- or thermally curing adhesive 609, for example with laser light as described above.

Figure 6E:
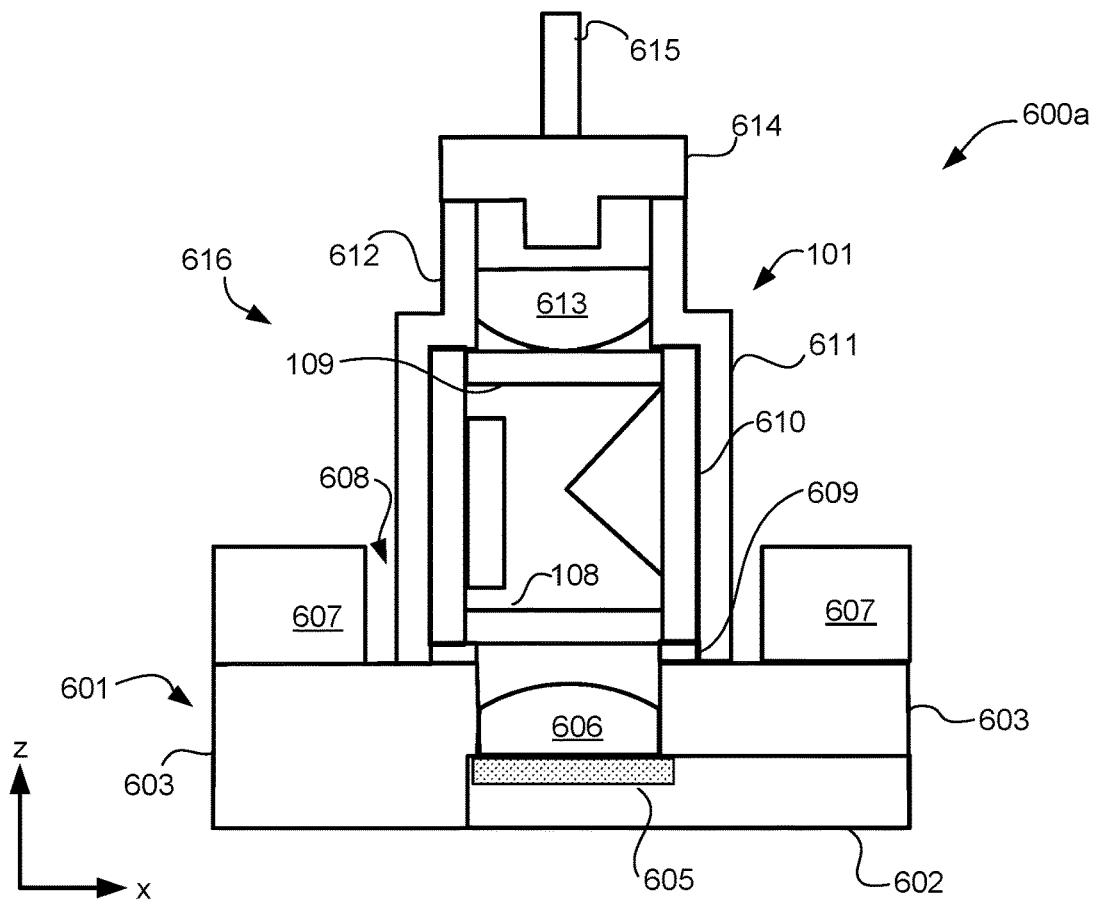

In FIG. 6E, MOKE module 101 may be encapsulated in jacket 611 after fastening (e.g., gluing) to package dielectric 603 by adhesive 609. Jacket 611 may comprise a pre-formed polymer, such but not limited to, thermoplastic or thermosetting materials or metals such as described above.

Jacket 611 may be press-fitted over casing 610 of MOKE module 101. In some embodiments, jacket 611 may comprise an optical coupling port 612, through which lens 613 may be inserted over MOKE module 101, forming semi-integrated MOKE optical interconnect 616. As shown, lens 613 is adjacent to polarizing filter 109. Completion of the assembly of optical package 600*a* may optionally include insertion of fiber end connector 614 into optical coupling port 612 and attachment of optical fiber 615 to fiber end connector 614.

Figure 6F:
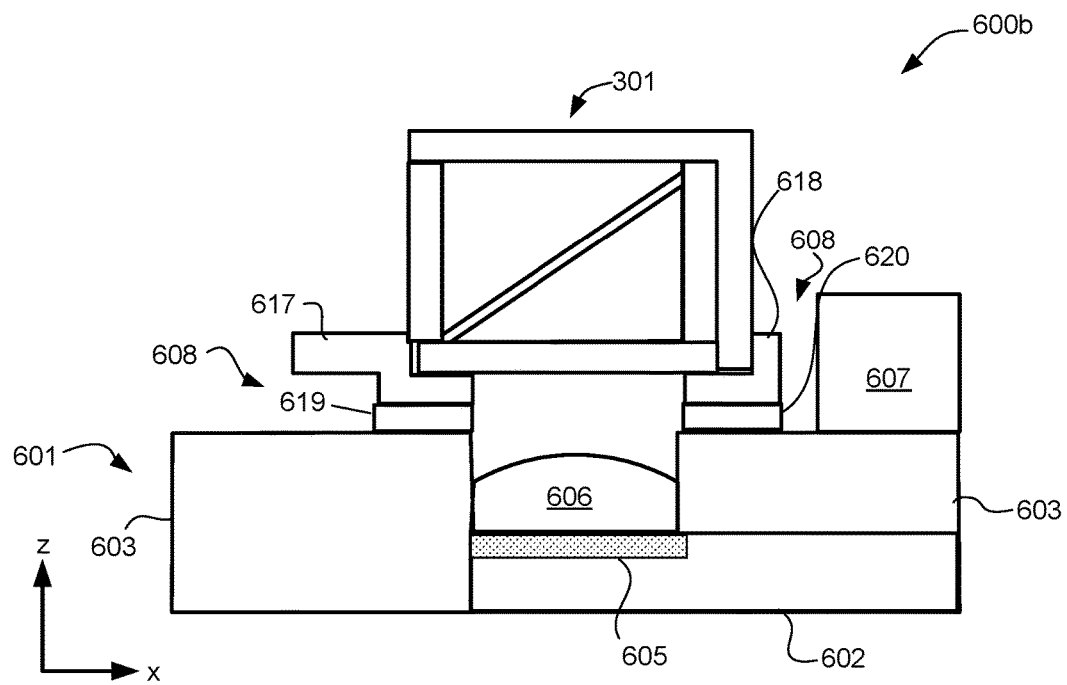

FIG. 6F shows an alternative assembly of optical package 600*b* after the operation shown in FIG. 6C whereby the process flow may be modified in FIG. 6F relative to FIG. 6D for optical package 600*a*. MOKE module 301 comprising beam splitter 303 may be substituted for MOKE module 101. MOKE module 301 may be pre-formed before assembly, comprising orthogonally-oriented optical coupling ports as shown in FIG. 3A. As shown in FIG. 6F, opening 608 may be enlarged to accommodate lateral attachment of optical fibers. Attachment structures 617 and 618 may be pre-assembled onto substrate 601 prior to enable attachment of MOKE module 301. Alternatively, attachment structures 617 and 618 may be assembled onto MOKE module 301 prior to attachment to package dielectric 603. Attachment structures 617 and 618 may be glued to package dielectric 603 by adhesive 619 and 620, which may be applied by the methods described above.

Figure 6G:
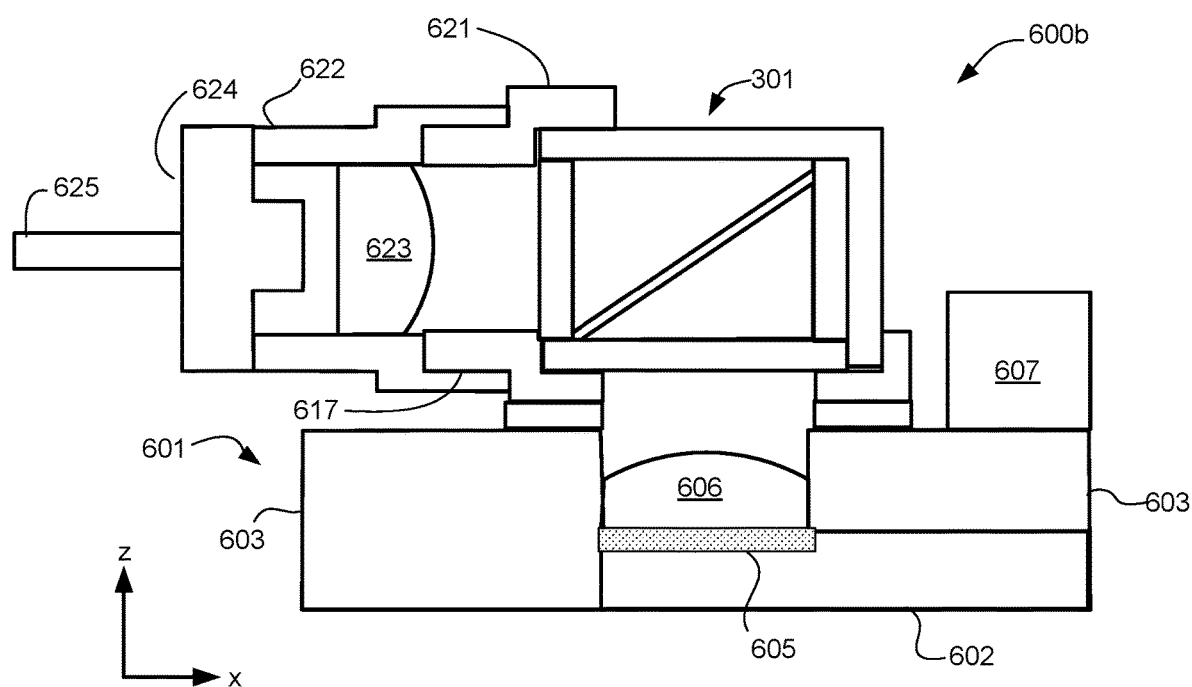

In FIG. 6G, a top-side attachment structure 621 may be incorporated on MOKE module 301. Optical coupling port 622 may be attached to attachment structures 617 and 620 by press-fit or by adhesion with a suitable glue. Optical coupling port 621 may comprise lens 623. In some embodiments, lens 623 is substantially the same composition and shape as lens 606. In other embodiments, lens 623 may have a different shape, focal length and/or composition than lens 606. Assembly of optical package 600*b* may be optionally complete with attachment of optical fiber end connector 624 for coupling to optical fiber 625.

Figure 7:
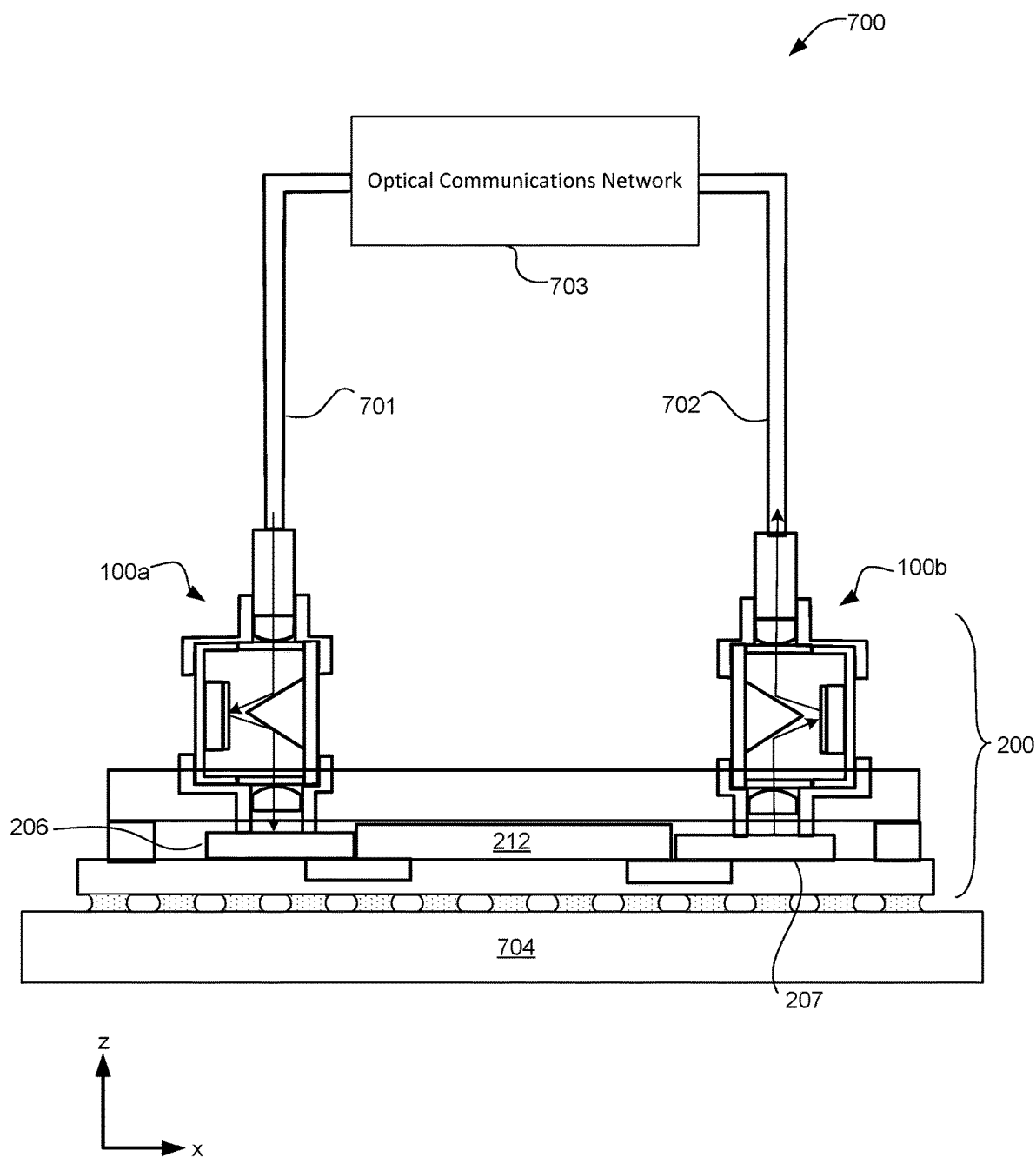
FIG. 7 illustrates a cross-sectional view in the x-z plane of an optical communications network comprising an optical package according to some embodiments of the disclosure.

FIG. 7 illustrates a cross-sectional view in the x-z plane of an optical communications network 700 comprising optical package 200, according to some embodiments of the disclosure.

While optical communications system 700 comprises optical package 200 in the illustrated embodiment of FIG. 7, any of the optical package embodiments described in this disclosure may be employed. Optical package 200 employs MOKE optical interconnects 100 (e.g., MOKE optical interconnects 100*a* and 100*b*) to couple optical signals to and from optical package 200 through optical fibers 701 and 702 to optical communications network 703. In some embodiments, MOKE optical interconnects 300 may be equally employed. According to some embodiments, the disclosed MOKE optical interconnects advantageously reduce backscatter coupling into the source of incoming and outgoing light. As backscattered light is stopped from coupling into the optical signal source, distortion of the optical signals due to destructive and constructive interference and standing waves resulting from the interaction between forward and backscattered light may be substantially suppressed or eliminated.

Figure 8:
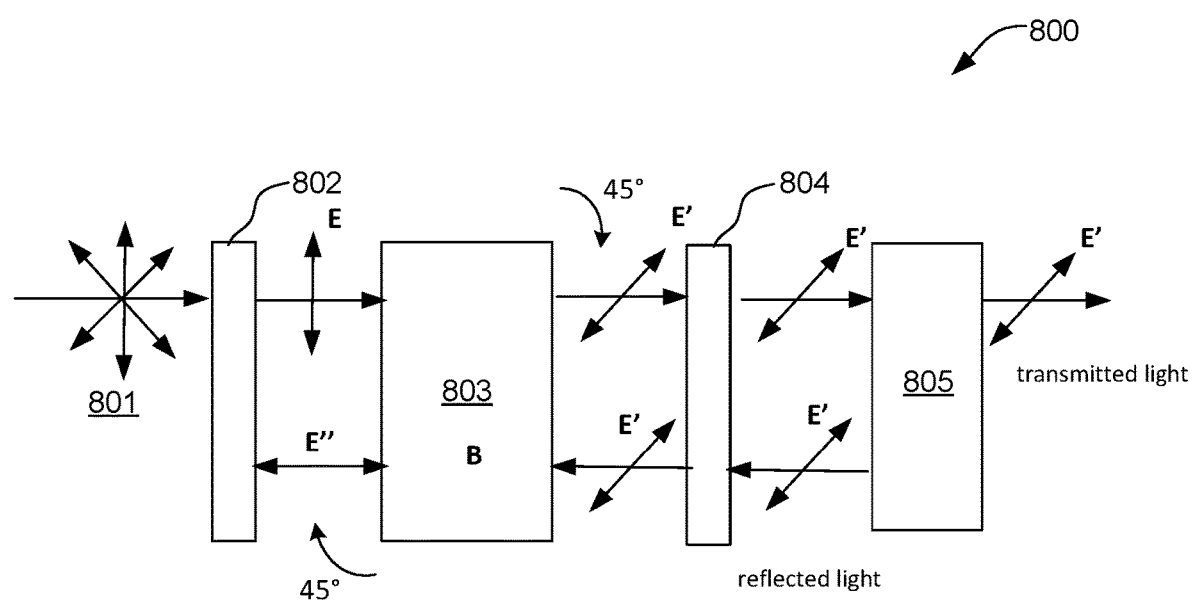
FIG. 8 illustrates a schematic optical path of light traversing a MOKE optical interconnect according to some embodiments of the disclosure. Suppression of interfering reflected light caused by MOKE interaction with reflected light reentering the MOKE optical interconnects is illustrated.

Data centers, server racks, cable television distribution and receiving equipment and computer mother boards are some of the systems that may comprise optical communications network 703. Optical package 200 may be part of a computer or other equipment that may generate and/or receive optical signals distributed through optical fiber networks. Optical package may be a multi-chip package that comprises at least one optical die and at least one IC (electronic) die (e.g., IC die 212) to which at least one optical die (e.g., optical dies 206 and 207) is or are coupled. Optical package 200 may be electrically coupled to a printed circuit board (PCB) 704 as a surface mount component or through a pin or BGA socket (as illustrated). Electrical signals and/or power may be routed into optical package 200. Optical signals may be routed into and out of optical package 200 by optical fibers 701 and 702. Exemplary light paths are indicated by the arrows traversing through MOKE optical interconnects 100*a* and 100*b*. Incoming optical signals carried by optical fiber 701 are coupled into optical die 106 on optical package 200 through MOKE optical interconnect 100*a*. Outgoing optical signals that may be generated by optical die 207 are coupled into optical fiber 702 through MOKE optical interconnect 100*b*. A schematic representation of the MOKE action on forward-propagated and backscattered light is illustrated in FIG. 8. Advantageously. MOKE optical interconnects may substantially block any backscattered light form back coupling into the signal source where it may cause harmful interference with forward-propagating optical signals. Bit error rates may be substantially reduced, potentially leading to larger bandwidths.

FIG. 8 illustrates a schematic optical path 800 of light traversing a MOKE optical interconnect according to some embodiments of the disclosure. Suppression of interfering reflected light caused by MOKE interaction with reflected light reentering the MOKE optical interconnects is illustrated.

Incoming unpolarized modulated light 801 propagates from left to right in the figure to a lens (not shown), which may collimate and focus the unpolarized light to polarizing filter 802. Light passing through may then be polarized to an angle E. E-polarized light may then be directed to MOKE medium 803 by reflection from internal mirrors (e.g., oblique mirror faces 111 or 112) within the MOKE optical interconnect. The MOKE interaction between the light and the B field of the MOKE medium rotates the forward propagating light to an angle E', which may be ±45° from the initial polarization angle (e.g., E). E'-polarized light may then pass through polarizing filter 804, which may have substantially the same polarization angle E', permitting E'-polarized light to pass through substantially unattenuated. E' polarized light passing through polarizing filter 804 may strike coupling optics element 805, where most of the light may pass through to couple into receiving optics. Coupling optics element 805 may be a lens, grating coupler, waveguide, or other reflective optical element that may be part of the coupling optics system. Some of the E'-polarized light may be reflected, backscattering to polarizing filter 804.

Some of the backscattered E'-polarized light may pass through polarizing filter 804 and reenter the MOKE optical interconnect. Any backscattered light impinging on MOKE medium 803 may be rotated a second time to an angle E" by interaction with B. E" may be substantially orthogonal to E, the original angle of polarization. E"-polarized light travelling toward the source may be substantially attenuated by polarizing filter 802, which may stop any light from back-coupling to the source.

Figure 9:
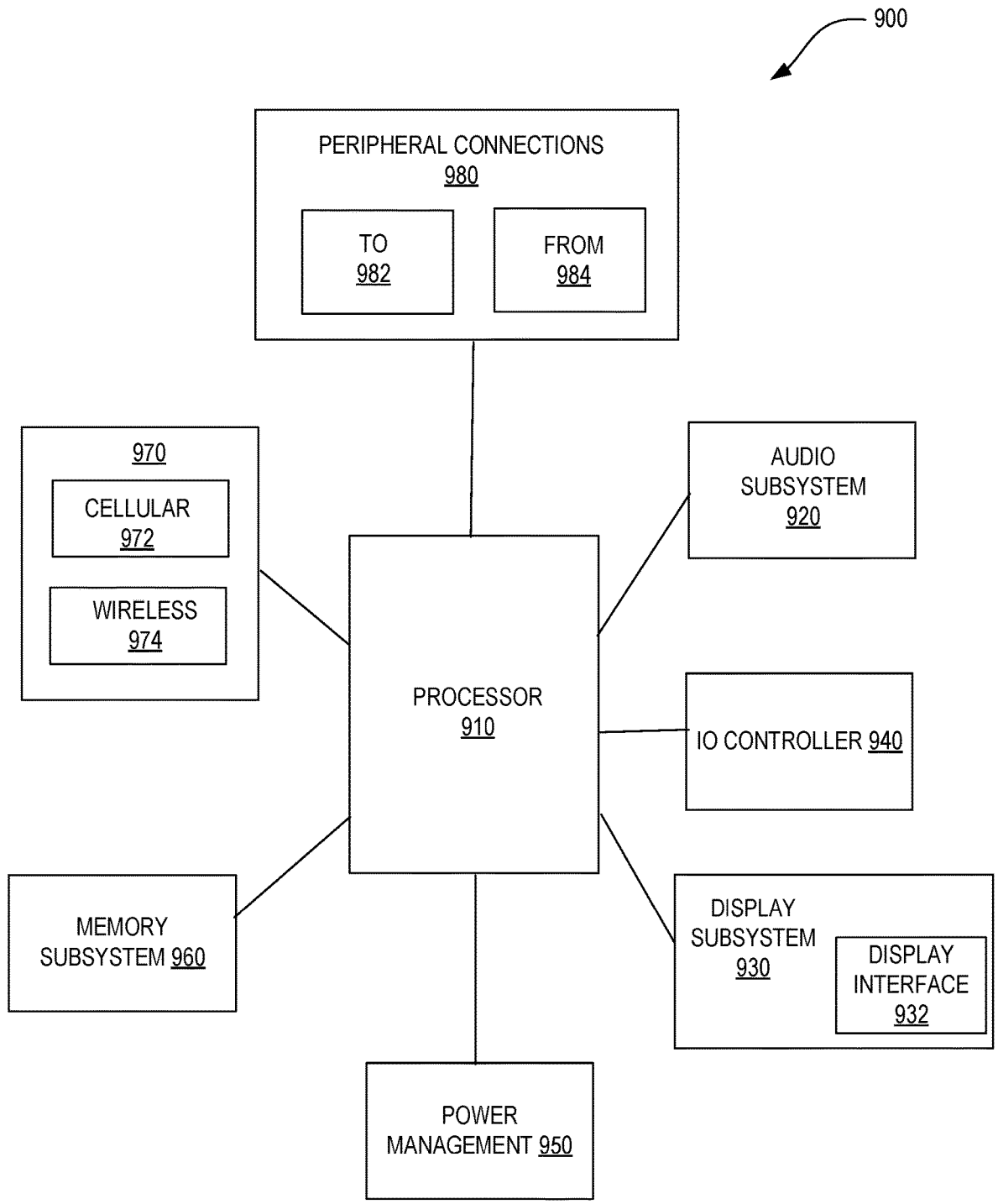
FIG. 9 illustrates a block diagram of a computing device as part of a system-on-chip (SoC) package in an implementation comprising an optical multichip package according to some embodiments of the disclosure.

FIG. 9 illustrates a block diagram of computing device 900 as part of a system-on-chip (SoC) package in an implementation comprising any of optical multichip package 100 or 200, according to some embodiments of the disclosure.

According to some embodiments, computing device 900 represents a server, a desktop workstation, or a mobile workstation, such as, but not limited to, a laptop computer, a computing tablet, a mobile phone or smart-phone, a wireless-enabled e-reader, or other wireless mobile device. Multichip IC packages, such as, but not limited to, a single- or multi-core microprocessor (e.g., representing a central processing unit), logic dies, RF dies, high power dies, memory dies, antenna dies, comprises a packages substrate having, for example.

In some embodiments, computing device has wireless connectivity (e.g., Bluetooth, WiFi and 5G network). It will be understood that certain components are shown generally, and not all components of such a device are shown in computing device 900.

The various embodiments of the present disclosure may also comprise a network interface within 970 such as a wireless interface so that a system embodiment may be incorporated into a wireless device, for example, cell phone or personal digital assistant. The wireless interface includes a millimeter wave generator and antenna array. The millimeter wave generator may be part of a monolithic microwave integrated circuit.

According to some embodiments, processor 910 represents a CPU or a GPU, and can include one or more physical devices, such as microprocessors, application processors, microcontrollers, programmable logic devices, or other processing means. Processor 910 may be coupled to a memory controller or high-speed serial I/O interface controller, as disclosed. The processing operations performed by processor 910 include the execution of an operating platform or operating system on which applications and/or device functions are executed. The processing operations include operations related to I/O (input/output) with a human user or with other devices, operations related to power management, and/or operations related to connecting the computing device 900 to another device. The processing operations may also include operations related to audio I/O and/or display I/O.

In one embodiment, computing device 900 includes audio subsystem 920, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 900, or connected to the computing device 900. In one embodiment, a user interacts with the computing device 900 by providing audio commands that are received and processed by processor 910

Display subsystem 930 represents hardware (e.g., display devices) and software (e.g., drivers) components that provide a visual and/or tactile display for a user to interact with the computing device 900. Display subsystem 930 includes display interface 932 which includes the particular screen or hardware device used to provide a display to a user. In one embodiment, display interface 932 includes logic separate from processor 910 to perform at least some processing related to the display. In one embodiment, display subsystem 930 includes a touch screen (or touch pad) device that provides both output and input to a user.

I/O controller 940 represents hardware devices and software components related to interaction with a user. I/O controller 940 is operable to manage hardware that is part of audio subsystem 920 and/or display subsystem 930. Additionally, I/O controller 940 illustrates a connection point for additional devices that connect to computing device 900 through which a user might interact with the system. For example, devices that can be attached to the computing device 900 might include microphone devices, speaker or stereo systems, video systems or other display devices, keyboard or keypad devices, or other I/O devices for use with specific applications such as card readers or other devices.

As mentioned above, I/O controller 940 can interact with audio subsystem 920 and/or display subsystem 930. For example, input through a microphone or other audio device can provide input or commands for one or more applications or functions of the computing device 900. Additionally, audio output can be provided instead of, or in addition to display output. In another example, if display subsystem 930 includes a touch screen, the display device also acts as an input device, which can be at least partially managed by I/O controller 940. There can also be additional buttons or switches on the computing device 900 to provide I/O functions managed by I/O controller 940.

In one embodiment, I/O controller 940 manages devices such as accelerometers, cameras, light sensors or other environmental sensors, or other hardware that can be included in the computing device 900. The input can be part of direct user interaction, as well as providing environmental input to the system to influence its operations (such as filtering for noise, adjusting displays for brightness detection, applying a flash for a camera, or other features).

In one embodiment, computing device 900 includes power management 950 that manages battery power usage, charging of the battery, and features related to power saving operation. Memory subsystem 960 includes memory devices for storing information in computing device 900. Memory can include nonvolatile (state does not change if power to the memory device is interrupted) and/or volatile (state is indeterminate if power to the memory device is interrupted) memory devices. Memory subsystem 960 can store application data, user data, music, photos, documents, or other data, as well as system data (whether long-term or temporary) related to the execution of the applications and functions of the computing device 900.

Elements of embodiments are also provided as a machine-readable medium (e.g., memory 960) for storing the computer-executable instructions. The machine-readable medium (e.g., memory 960) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity via network interface 970 includes hardware devices (e.g., wireless and/or wired connectors and communication hardware) and software components (e.g., drivers, protocol stacks) to enable the computing device 900 to communicate with external devices. The computing device 900 could be separate devices, such as other computing devices, wireless access points or base stations, as well as peripherals such as headsets, printers, or other devices.

Network interface 970 can include multiple different types of connectivity. To generalize, the computing device 900 is illustrated with cellular connectivity 972 and wireless connectivity 974. Cellular connectivity 972 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 974 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 980 include hardware interfaces and connectors, as well as software components (e.g., drivers, protocol stacks) to make peripheral connections. It will be understood that the computing device 900 could both be a peripheral device ("to" 982) to other computing devices, as well as have peripheral devices ("from" 984) connected to it. The computing device 900 commonly has a "docking" connector to connect to other computing devices for purposes such as managing (e.g., downloading and/or uploading, changing, synchronizing) content on computing device 900. Additionally, a docking connector can allow computing device 900 to connect to certain peripherals that allow the computing device 900 to control content output, for example, to audiovisual or other systems.

In addition to a proprietary docking connector or other proprietary connection hardware, the computing device 900 can make peripheral connections 980 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 is an optical package, comprising an optical die electrically coupled to a package substrate, an optical interconnect adjacent the optical die, the optical interconnect comprising a first polarizing filter adjacent to a first lens, a second polarizing filter adjacent to a second lens, and a film comprising a magnetic material between the first polarizing filter and the second polarizing filter, the second polarizing filter rotated with respect to the first polarizing filter and the magnetic material to rotate a polarization vector of incoming light to the optical interconnect, and an optical fiber interface port immediately adjacent to the first lens, wherein the second lens is immediately adjacent to an optical interface of the optical die.

Example 2 includes all of the features of example 1, wherein the optical interconnect further comprises a beam-splitter prism between the first polarizing filter and the film.

Example 3 includes all of the features of example 2, wherein the beam-splitter prism has a polarized dielectric coating.

Example 4 includes all of the features of any one of examples 1 through 3, wherein the optical interconnect further comprises a prism having at least two reflective surfaces between the first polarizing filter and the second polarizing filter and opposite the film.

Example 5 includes all of the features of any one of examples 1 through 4, wherein the optical interconnect further comprises a coil conductor adjacent to the film.

Example 6 includes all of the features of example 5, wherein a geometric axis of the coil conductor is parallel to the optical axis of the first lens.

Example 7 includes all of the features of example 5, wherein a geometric axis of the coil conductor is orthogonal to the optical axis of the first lens.

Example 8 includes all of the features of any one of examples 5 through 7, wherein the coil conductor is electrically coupled to electrical interconnects on the surface or to electrical interconnects on the package substrate.

Example 9 includes all of the features of any one of examples 1 through 8, wherein the film is permanently magnetized.

Example 10 includes all of the features of any one of examples 1 through 9, wherein the optical interconnect comprises a mounting interface adjacent to the second lens, wherein the mounting interface comprises a base.

Example 11 includes all of the features of examples 10, further comprising an optical port within a dielectric, wherein the optical interconnect extends through the optical port, the base is affixed to the dielectric by an adhesive layer.

Example 12 is a system comprising an optical package comprising an optical die electrically coupled to a package substrate, an optical interconnect adjacent the optical die, the optical interconnect comprising a first polarizing filter adjacent to a first lens, a second polarizing filter adjacent to a second lens, and a film comprising a magnetic material between the first polarizing filter and the second polarizing filter, the second polarizing filter rotated with respect to the first polarizing filter and the magnetic material to rotate a polarization vector of incoming light to the optical interconnect, and an optical fiber interface port immediately adjacent to the first lens, wherein the second lens is immediately adjacent to an optical interface of the optical die, wherein the package substrate is coupled to a printed circuit board, and wherein the optical interconnect comprises an optical fiber port adjacent to the first lens, the optical fiber port is coupled to an optical fiber.

Example 13 includes all of the features of example 12, wherein the optical interconnect comprises a coil conductor adjacent to the film, wherein the coil conductor is electrically coupled to a controller IC and power source electrically coupled to the printed circuit board.

Example 14 is a method for making a optical package, comprising receiving a partially completed optical package comprising one or more optical dies within a dielectric, the one or more optical dies electrically coupled to a substrate, insertion of a lens within an opening in the optical package over a optical die, formation of a photosensitive layer over the optical package, forming an opening within the photosensitive layer over the lens; and inserting an optical interconnect comprising a magneto-optical Kerr effect (MOKE) module into the opening and over the lens;

Example 15 includes all of the features of example 14, wherein inserting an optical interconnect into the opening and over the lens comprises inserting a MOKE module through the opening and affixing a base of the MOKE module to the dielectric with an adhesive material.

Example 16 includes all of the features of examples 14 or 15, further comprising encapsulating the MOKE module in a polymeric shell.

Example 17 includes all of the features of example 16, further comprising attaching a lens and optical fiber interface port to the shell.

Example 18 is a method for making a photonic integrated circuit (optical) package, comprising receiving a optical package comprising one or more optical dies within a dielectric, and an opening over an optical coupler on the one or more optical dies, attaching an optical interconnect comprising a magneto-optical Kerr effect (MOKE) optical module.

Example 19 includes all of the features of example 18, wherein attaching the optical interconnect comprising a MOKE module comprises attaching a vertical mount to the optical package, wherein the vertical mount is affixed to a top surface of the dielectric over the opening, and attaching the MOKE module to the vertical mount.

Example 20 includes all of the features of examples 18 or 19, wherein attaching the optical interconnect comprising a MOKE module comprises attaching an edge mount to the optical package, wherein the edge mount is affixed to a sidewall of the optical package, and the attaching the MOKE module to the edge mount.

We claim:

1. An optical package, comprising:
   an optical die electrically coupled to a package substrate;
   an optical interconnect adjacent the optical die, the optical interconnect comprising:
   a first polarizing filter adjacent to a first lens;
   a second polarizing filter adjacent to a second lens; and
   a film comprising a magnetic material between the first polarizing filter and the second polarizing filter, the second polarizing filter rotated with respect to the first polarizing filter and the magnetic material to rotate a polarization vector of incoming light to the optical interconnect; and
   an optical fiber interface port immediately adjacent to the first lens, wherein the second lens is immediately adjacent to an optical interface of the optical die.

2. The optical package of claim 1, wherein the optical interconnect further comprises a beam-splitter prism between the first polarizing filter and the film.

3. The optical package of claim 2, wherein the beam-splitter prism has a polarized dielectric coating.

4. The optical package of claim 1, wherein the optical interconnect further comprises a prism having at least two reflective surfaces between the first polarizing filter and the second polarizing filter and opposite the film.

5. The optical package of claim 1, wherein the optical interconnect further comprises a coil conductor adjacent to the film.

6. The optical package of claim 5, wherein a geometric axis of the coil conductor is parallel to an optical axis of the first lens.

7. The optical package of claim 5, wherein a geometric axis of the coil conductor is orthogonal to an optical axis of the first lens.

8. The optical package of claim 5, wherein the coil conductor is electrically coupled to electrical interconnects on the package substrate.

9. The optical package of claim 1, wherein the film is permanently magnetized.

10. The optical package of claim 1, wherein the optical interconnect comprises a mounting interface adjacent to the second lens, wherein the mounting interface comprises a base.

11. The optical package of claim 10, further comprising an optical port within a dielectric, wherein the optical interconnect extends through the optical port, the base is affixed to the dielectric by an adhesive layer.

12. A system, comprising:
    an optical package, comprising:
    an optical die electrically coupled to a package substrate;

an optical interconnect adjacent the optical die, the optical interconnect comprising:
- a first polarizing filter adjacent to a first lens;
- a second polarizing filter adjacent to a second lens; and
- a film comprising a magnetic material between the first polarizing filter and the second polarizing filter, the second polarizing filter rotated with respect to the first polarizing filter and the magnetic material to rotate a polarization vector of incoming light to the optical interconnect; and an optical fiber interface port immediately adjacent to the first lens, wherein the second lens is immediately adjacent to an optical interface of the optical die; and a printed circuit board coupled to the package substrate, wherein the optical fiber interface port is coupled to an optical fiber.

13. The system of claim 12, wherein the optical interconnect comprises a coil conductor adjacent to the film, wherein the coil conductor is electrically coupled to a controller IC and power source electrically coupled to the printed circuit board.

\* \* \* \* \*